US009126113B2

(12) United States Patent
Johnson et al.

(10) Patent No.: US 9,126,113 B2
(45) Date of Patent: Sep. 8, 2015

(54) PROJECTION BUTTON

(71) Applicant: IGT, Reno, NV (US)

(72) Inventors: Charles Johnson, Reno, NV (US); Chauncey W. Griswold, Reno, NV (US)

(73) Assignee: IGT, Las Vegas, NV (US)

( * ) Notice: Subject to any disclaimer, the term of this patent is extended or adjusted under 35 U.S.C. 154(b) by 359 days.

(21) Appl. No.: 13/739,938

(22) Filed: Jan. 11, 2013

(65) Prior Publication Data

US 2013/0130796 A1 May 23, 2013

Related U.S. Application Data

(62) Division of application No. 12/769,032, filed on Apr. 28, 2010, now abandoned.

(51) Int. Cl.
*A63F 9/00* (2006.01)
*A63F 13/90* (2014.01)
*G07F 17/32* (2006.01)

(52) U.S. Cl.
CPC ............ *A63F 13/08* (2013.01); *G07F 17/3209* (2013.01)

(58) Field of Classification Search
None
See application file for complete search history.

(56) References Cited

U.S. PATENT DOCUMENTS 4,313,108 A 1/1982 Yoshida
5,181,122 A * 1/1993 Ooishi .......................... 348/779
6,065,844 A * 5/2000 Chen .............................. 359/857
6,667,738 B2 12/2003 Murphy
6,988,247 B2 1/2006 Janevski
7,452,276 B2 11/2008 Loose et al.
7,628,701 B2 12/2009 Wells
7,892,096 B2 2/2011 Rigsby et al.

(Continued)

FOREIGN PATENT DOCUMENTS

JP 2006-255259 9/1996

OTHER PUBLICATIONS

US Office Action dated May 15, 2012 issued in U.S. Appl. No. 12/769,032.

(Continued)

*Primary Examiner* — Seng H Lim
(74) *Attorney, Agent, or Firm* — Neal, Gerber & Eisenberg LLP

(57) ABSTRACT

The disclosure relates generally to different devices, methods, systems, and computer program products for a gaming machine that includes a projection button panel. The projection button panel may include one or more projection buttons configured to receive user input. Each projection button may include a projection surface disposed within the button capable of being viewed by a player of the gaming machine. Each projection button may also include a button projector proximate to the projection surface. Further, each projection button may be configured to receive button image information and to project, based on the received button image information, a button image onto the projection surface. Each projection button may also include one or more sensors capable of being activated responsive to activation of the button. The gaming machine may also include one or more controllers in communication with the main display and the button assembly. The one or more controllers may be configured to transmit the image information for display at one or more of the buttons, receive the signal from the button assembly indicating that one or more of the sensors have been activated, and/or process the received signal.

31 Claims, 8 Drawing Sheets

(56) References Cited

U.S. PATENT DOCUMENTS

| | | | | |
|---|---|---|---|---|
| 8,154,527 | B2 | 4/2012 | Ciesla et al. | |
| 2002/0054030 | A1 | 5/2002 | Murphy | |
| 2003/0216174 | A1 | 11/2003 | Gauselmann | |
| 2004/0038721 | A1 | 2/2004 | Wells | |
| 2005/0187017 | A1* | 8/2005 | Matsuno et al. | 463/34 |
| 2005/0187018 | A1* | 8/2005 | Takeda et al. | 463/34 |
| 2005/0239526 | A1* | 10/2005 | Takeda | 463/13 |
| 2006/0040739 | A1* | 2/2006 | Wells | 463/37 |
| 2006/0189387 | A1 | 8/2006 | Rigsby et al. | |
| 2007/0010318 | A1 | 1/2007 | Rigsby et al. | |
| 2008/0012936 | A1* | 1/2008 | White | 348/14.16 |
| 2008/0090658 | A1* | 4/2008 | Kaji et al. | 463/31 |
| 2008/0167123 | A1* | 7/2008 | Luciano et al. | 463/31 |
| 2008/0311987 | A1 | 12/2008 | Hirato | |
| 2010/0240435 | A1* | 9/2010 | Gagner et al. | 463/20 |
| 2011/0212774 | A1* | 9/2011 | Wudtke et al. | 463/30 |

OTHER PUBLICATIONS

US Final Office Action dated Oct. 16, 2012 issued in U.S. Appl. No. 12/769,032.

US Third-Party Submission in U.S. Appl. No. 12/769,032 dated Jan. 3, 2012.

Pico™ Projector Displays: Overview (2009), Microvision, Inc., sales document retrieved on Apr. 26, 2010 from the Internet at http://www.microvision.com/pico_projector, 1 pg.

Pico™: Evaluation Kit (PEK) (2009), Preliminary Specifications, Document No. DA0124619, Microvision, Inc., Redmond, Washington, 1 pg.

* cited by examiner

PROJECTION BUTTON

RELATED APPLICATION

This application is a division of Ser. No. 12/769,032, filed Apr. 28, 2010, which is incorporated by reference herein in its entirety for all purposes.

TECHNICAL FIELD

The present invention relates generally to gaming devices and systems, and more specifically to buttons for gaming devices.

BACKGROUND OF THE INVENTION

Casinos and other forms of gaming are a particular example of an industry where electronic machines, such as, for example, microprocessor based gaming machines, are extremely popular. In a typical electronic gaming machine, such as a slot machine, video poker machine, video keno machine or the like, a game play is first initiated through a player wager of money or credit, whereupon the gaming machine determines a game outcome, presents the game outcome to the player and then potentially dispenses an award of some type, including a monetary award, depending upon the game outcome. Electronic and microprocessor based gaming machines can include a variety of hardware and software components to provide a wide variety of game types and game playing capabilities, with such hardware and software components being generally well known in the art. A typical electronic gaming machine can include hardware devices and peripheral such as bill validators, coin acceptors, card readers, keypads, buttons, levers, touch screens, coin hoppers, player tracking units and the like. In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others.

The design and manufacture of such gaming machines and other electronic machines has become increasingly complex, particularly with the advent of multiple displays, sound output devices, touch screens, buttons, currency acceptors, card acceptors and an assortment of other peripheral devices that may be part of such machines. One type of item that can be found on many such machines is a "button panel" having a plurality of input buttons that are arranged or configured in a particular fashion for a user of the machine. As is generally known, buttons for such button panels tend to be relatively large and spaced apart from each other in a fashion that is distinctive from smaller keypad types of buttons and arrangements. In particular, such button panels can be found, for example, on coin-operated video games, video poker machines, video keno machines, electronic slot machines, and the like. One example of a generally well-known button panel could be the arrangement of buttons that typically exist on a video poker machine, the button panel for which can include one hold/drop button for each video poker card, a deal/draw button, a repeat bet button, one or more other betting buttons, a cash out button, and/or a service button, among others. While the entire collection of these buttons on the front panel of the video poker machine can be generally be referred to as the "button panel" for that machine, such a button panel might also include one or more other buttons located elsewhere about the machine, or could be a subset of all of the buttons on the front panel of the machine, as may be desired.

For many years, gaming machines were 'standalone' in that they had very limited ability to communicate with external devices other than Player Tracking systems. This of course has changed with the advent of Server Based ("SB") games. This change introduced a need for what is called 'dynamic buttons.' In non-SB games, the function of a button often remained constant for the life of the gaming machine. However, in an SB environment, players may be given the option to select from a wide range of games which may in turn require that the function of each button be reconfigurable. Thus, dynamic buttons often contain an embedded, electronically controlled display whose display content may be controlled by game software.

A key benefit of dynamic buttons is flexibility. Dynamic buttons may display static content, dynamic content, or some combination thereof. For example, dynamic buttons may display static button labels or animated button labels. The content displayed on a panel of dynamic buttons may be fixed or coordinated between buttons (e.g., an animation across more than one button). The content displayed on one or more dynamic buttons may be generated locally (e.g., by a gaming machine) or received via a network.

Dynamic buttons may enhance player enjoyment and/or gaming machine usability. For example, dynamic buttons may allow the same button to be used for different features on the same gaming machine (e.g., within the same game). As another example, players may enjoy seeing video or animation displayed on dynamic buttons. In some embodiments, the ability to dynamically change what is displayed on a button may make it easier to provide clear instructions or other information to a player.

Accordingly, it would be desirable to develop improved techniques for providing dynamic buttons in a gaming machine.

SUMMARY OF THE INVENTION

Various embodiments described or referenced herein are directed to different devices, methods, systems, and computer program products for projection buttons. In some embodiments, devices, methods, systems, and computer program products may be configured or designed for use in a casino environment.

According to various embodiments, a gaming machine may include a gaming machine cabinet; a main display configured to display game play data of one or more games of chance; an output device configured to output an item of value based on play of the one or more games of chance; and/or a projection button panel configured to receive user input. The projection button panel may include a plurality of projection buttons, one or more of which are operable to place a wager on the one or more games of chance. Each projection button may comprise a projection surface disposed on an interior side of the button, the projection surface capable of being viewed from an exterior side of the button by a player of the gaming machine; a button projector proximate to the projection surface, the button projector configured to receive button image information and to project, based on the received button image information, a button image onto the projection surface; and/or one or more sensors capable of being activated responsive to activation of the button, the one or more sensors configured to output a signal indicating that one or more of the sensors have been activated. The gaming machine may also include one or more controllers in communication with the main display and the projection button panel. The one or more controllers may be configured to output the game play data to the main display; transmit, to the projection button panel, the button image information; receive, from the projection button panel, the signal indicating that one or more of the sensors have been activated; and/or process the received signal to identify a selection associated with the projected button image.

In at least one embodiment, the button projector may be a laser projector configured to modulate one or more laser beams in order to project a raster-based image. According to various embodiments, one or more projection buttons may further comprise one or more lenses, one-way mirrors, two-way mirrors, button caps, mechanical sensors, touch sensors.

In one or more embodiments, a gaming machine may include a gaming machine cabinet; a main display; an output device; and/or a projection button panel. The projection button panel may include a plurality of projection buttons. Each projection button may comprise a projection surface disposed on an interior side of the button; one or more sensors capable of being activated responsive to input; and/or a button projector proximate to one or more of the projection surfaces associated with the plurality of projection buttons. The button projector may be configured to receive button image information and to project, based on the received button image information, a button image onto the one or more projection surfaces. The gaming machine may also include one or more controllers configured to output the game play data to the main display; transmit, to the projection button panel, the button image information; receive, from the projection button panel, the signal indicating that one or more of the sensors have been activated; and/or process the received signal to identify a selection associated with the projected button image.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DETAILED DESCRIPTION

Figure 1:
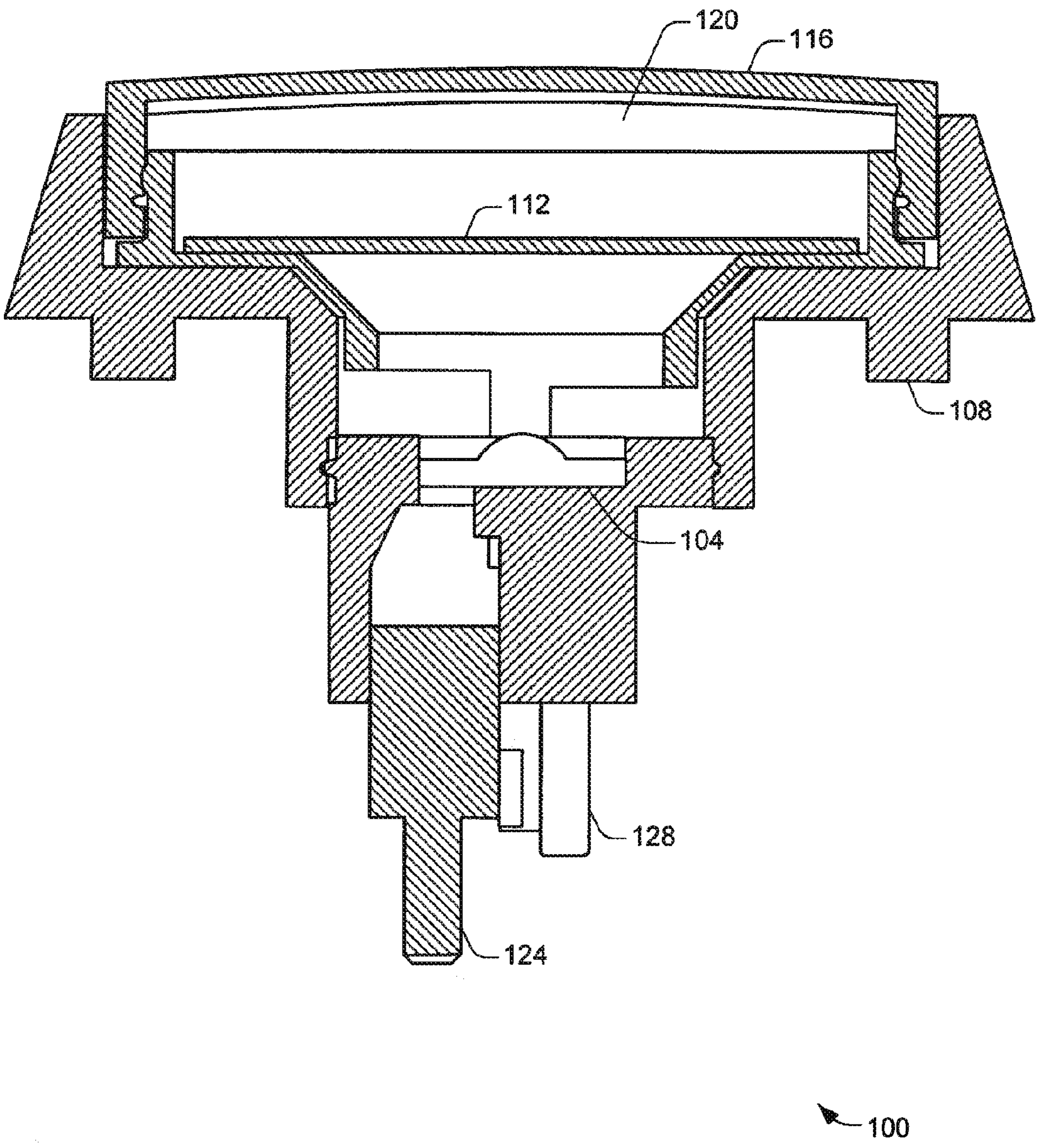
FIG. 1 shows a diagram representing a projection button, constructed in accordance with one embodiment of the present invention.

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Techniques are described herein for providing improved dynamic buttons for use in a gaming machine. Conventional dynamic buttons may use a video display such as a Light Emitting Diode (LED) display, an Organic Light Emitting Diode (OLED) display, or a liquid crystal display (LCD). One example of a dynamic button is available from IGT, Inc. of Reno, Nev. IGT's dynamic button includes an OLED switch matrix embedded in the switch body along with a separate control board mounted elsewhere within the gaming cabinet. However, at least some dynamic buttons that include a video display screen may have one or more drawbacks.

A first concern is that dynamic buttons are often expensive. A monochrome display button may cost, for example, over $30, while the control board may cost nearly $200. Thus, a game with 10 dynamic buttons may cost a manufacturer an extra $500 over the same game without these dynamic buttons. With markup, the additional cost to a customer may be well over $1000. These costs would likely be even higher if the dynamic buttons included color displays.

A second concern is the Non Recurring Engineering (NRE) cost to develop each new button variation. In a game with relatively little space on the front panel, such as a bar top game, it may be desirable to have a small button. In contrast, larger games such as an upright game or slant top game may benefit from the use of larger buttons. Each button of a new size or shape may require substantial NRE to develop a correspondingly sized display panel (e.g., an LED, LCD, or OLED), flex strip, and/or other supporting components.

A third concern is the possibility of reliability issues and the associated warranty costs. Significant engineering effort has been expended to harden buttons against damage from Electro Static Discharge (ESD), mechanical impact, and fluid spills. However, the nature of the video display (e.g., the OLED) in a dynamic button often requires that it be placed at the top of the button to facilitate visibility. This positions the display where it may be exposed both to the mechanical shock of player pounding on the buttons and in close proximity to where ESD events are most likely to originate (e.g., a player's finger).

A fourth concern is that a dynamic button that includes a video display has a contrast ratio and/or a screen resolution that is limited by the pixel density of the video display. Thus, in many dynamic buttons that use video displays, individual pixels may be visible to a user.

A fifth concern is that many high-performance video displays used in dynamic buttons may have a limited lifespan. When a dynamic button is not working, players may avoid using a gaming machine (e.g., due to concern that the gaming machine is broken). Also, replacing video displays can be expensive and time-consuming. For example, the cost of replacing a video display may include costs associated with labor, hardware components, and/or machine downtime.

Accordingly, disclosed herein are dynamic buttons that use projector technology to provide a dynamic display. In one or more embodiments, a projector may be mounted in proximity to the back of a button's body and project an image on to the button's cap. The button cap may have a grating or texture, which may be similar to that used in rear projection television, that is visible to a player. Some embodiments that incorporate such display techniques may offers one or more design advantages over video display (e.g., OLED) buttons.

For example, creating different and/or custom-sized projection buttons may entail reduced NRE costs in comparison to conventional dynamic buttons. In one or more embodiments, a lens may be used to affect the projection angle of the beam. The use of such a lens may allow buttons of different sizes to have similar button body depth. Additionally, or alternately, the button projector may be moved within the body of the button to compensate for changed button size. Thus, in some embodiments, buttons of different sizes and/or shapes may be developed with identical or similar electronic components (e.g., the button projector).

As another example, the use of a projector may allow one or more components associated with the button electronics to be physically removed from a location on the button closest to electrical shock and mechanical impact to a location that is further away from these effects. For example, the button projector may be mounted at the rear of the projection button or located outside the button assembly. In one or more embodiments, this change may improve resistance to harsh environments.

As yet another example, one or more embodiments of a projection button may provide advantages in cost, display resolution, and/or contrast ratio. In one or more embodiments, a button projector associated with a projection button may provide a contrast ratio of approximately 5000 to 1 and/or a display resolution of 848×480 at 60 hertz. However, different embodiments may include button projectors with different contrast ratios, display resolutions, and/or refresh rates.

These characteristics may compare favorably to the displays used in many conventional dynamic buttons. Further, the ability to vary the distance between the button projector and projection surface and/or optically manipulate the light generated by the button projector may allow a projection button with much higher pixel density than conventional dynamic buttons.

It should be noted that the display resolution of the button projector may be different than the resolution of the image actually displayed at the button surface. For example, in some embodiments the image generated by the button projector may be cropped to fit a particular projection button. As another example, a single button projector may be used to generate images for more than one button.

As yet another example of a potential advantage, some projection buttons may have significantly longer lifespan than conventional dynamic buttons. The extended lifespan may be due in part to reduced impact and/or electrostatic discharge associated with placing the button projector away from the button surface. Additionally, or alternately, one or more button projectors may have a naturally longer lifespan than many video displays.

It will be appreciated that significant differences exist between projection-based techniques and non-projection based techniques. Non-projection based display techniques typically involve emitting a field of light using a video display screen. Thus, when using a non-projection based display technique, the user must have a direct line of site to the optical source of the image (i.e. the display screen) to view an image generated by the display screen. Non-projection based display techniques may involve displaying images on video displays such as Liquid Crystal Displays (LCDs), Light Emitting Diode (LED) displays, Organic Light Emitting Diode (OLED) displays, etc.

Projection-based display techniques typically use a projector or projection engine to project images from one or more light sources that approximate a point onto a projection surface spaced from the projector. Thus, in contrast to non-projection based display techniques, the user of a projection-based system need only have a line of sight to the projection surface, not the original source of the projected image. Projection-based display techniques include laser-based projection systems (e.g., the PicoProjector available from Microvision, Inc., of Redmond, Wash.), Digital Light Processing techniques, holographic laser projection (e.g., a projection system available from Light Blue Optics of Cambridge, United Kingdom), etc. (or some combination thereof).

Different projection systems have various sizes, optical characteristics, prices, and other properties. Accordingly, a projection system may be strategically chosen based on the desired configuration of a given projection button or projection button panel. For example, a projection system may include laser and/or non-laser projection techniques. Additionally, a projection system may include one or more lasers, mirrors, prisms, or other light directing components.

FIGS. 1-13 illustrate embodiments of projection buttons, as well as gaming machines and button panels that employ projection buttons. According to various embodiments, various types, sizes, shapes, colors, numbers, combinations, and configurations of one or more projection buttons and/or associated components may be used. Thus, the techniques described herein are not limited to the embodiments of projection buttons illustrated in FIGS. 1-13.

FIG. 1 shows a diagram representing a projection button, constructed in accordance with one embodiment of the present invention. The projection button 100 includes a button projector 104 disposed within a button casing 108. The button projector 104 is configured to receive image information from a button controller via image data communications interface 128. The button projector 104 is configured to project an image onto a projection surface 120 through a lens 112, which is covered by a button cap 116. Pressure on the button cap 116 depresses a plunger, which activates button activation communications interface 124.

The projection button 100 may be configured to display a dynamic button image to a user, such as a label indicating a user input selection. For example, the projection button 100 may be configured to display a static or dynamic gaming-related button label such as "Deal," "Draw," "Fold," etc. As another example, the projection button may be configured to display an animation or video unrelated to a label, such as an indication of an award, an animation for attracting players, etc. In some embodiments, the video and/or images displayed on the projection button may change as a game progresses. Additionally, or alternately, the video and/or images displayed on the projection button may be different for different games available at a gaming machine.

The button projector 104 may include any type of projector sufficiently small to be disposed within the projection button 100. In one or more embodiments, the button projector 104 may include a PicoProjector laser projection system available from Microvision. In a laser projection system, pixels may be generated by combining modulated laser light sources (e.g., red, green, blue, etc.). The intensity of each of the light sources may be varied to generate a complete palette of colors and shades. For example, red pixels may require the red laser to be turned on while the blue and green lasers are turned off. As another example, purple pixels may require that the red and blue lasers are turned on while the green laser is turned off. A scanning mirror may direct the beam of light toward the projection surface 120. In some embodiments the beam of light may be directed toward additional optical instruments, such as one or more lenses and/or mirrors, before being projected onto the projection surface 120.

In some embodiments, pixels may be lighted by a repetitive horizontal scanner motion that rapidly sweeps a light beam to place the pixels into rows and a vertical scanner motion that moves the light beam up and down to points where successive rows of pixels are drawn. This process continues until an entire field of rows has been placed and a full image appears to the user. In different embodiments, the sequential operation of the horizontal and vertical scanners may be configured differently (e.g., reversed).

In one or more embodiments, the button projector 104 is designed to operate with DC current transmitted at a low voltage (e.g., 12 volts). Further, the button projector 104 may be designed to receive a Red Green Blue ("RGB") Video Graphics Array ("VGA") signal, an HDMI signal, a DVI signal, or various other types of video signals. Thus, the projection button 100 shown in FIG. 1 may be used in conjunction with electrical and/or control components associated with conventional dynamic buttons. For example, the projection button may interoperate with an addressable interface on a flex cable used to communicate with conventional dynamic buttons. However, in different embodiments, different electrical inputs and/or video signals may be used.

The button projector 104 is disposed within the button casing 108. Button casing 108 may be any type of button casing configured to contain one or more components associated with the projection button 100. For example, various types of button casings, as well as other standard button components, are found in buttons available from IGT, Inc., of Reno, Nev.

The button projector 104 is configured to receive image data from one or more controllers via the button image communication interface 128. The button image communication interface 128 may be any type of interface for receiving image data to project using the button projector 104. For example, the button image communication interface 128 may be configured to receive data transmitted via a USB interface, a Netplex interface (available from IGT, Inc. of Reno, Nev.), or another type of interface. According to various embodiments, the button image communication interface 128 may be activated by one or more activation mechanisms, such as a mechanical plunger, touch sensor, electromechanical pressure sensor, etc.

In one or more embodiments, the projection button 100 and/or one or more controllers associated with the projection button may include localized storage to store static and/or dynamic graphical data. Localized storage may allow the use of the dynamic button to display button data without requiring a constant stream of video data from game electronics. Thus, if the image or video to be displayed at a given projection button is constant throughout a game (e.g., a "Deal/Draw" button in many video poker games), then the projection button may be configured to continue displaying the appropriate image or video without continuous input from the game electronics.

The button projector 104 projects one or more images onto the projection surface 308 through the lens 316. According to various embodiments, different types, numbers, and/or configurations of lenses may be used, depending on the desired optical effect. The use of lenses is discussed in greater detail elsewhere in this specification (e.g., in reference to FIGS. 3 and 4).

The button image is projected is projected through the lens 316 onto the projection surface 120. The projection surface 120 may be made of any material suitable for receiving and displaying one or more images generated by the button projector 104. In one or more embodiments, the projection surface 120 may be a light-colored, partially opaque surface.

Different projection surfaces may vary in color, opacity, brightness, light diffusion, price, or other characteristics. Accordingly, the type of projection surface used with a given projection button or projection button panel may be strategically selected based on various factors. An example of one such projection surface is a Clarex® Blue Ocean® Screen, available from Nitto Jushi Kogyo Co., Ltd of Tokyo, Japan.

In one or more embodiments, the projection surface may be integrated with other components of a projection button and/or projection button panel. For example, portions of a projection button panel including one or more projection surfaces, hinges, bellows, panels, and/or lenses may be created as an integrated component. An integrated component may be constructed according to one or more molding techniques, such as co-molding, injection molding, or vacuum molding. Configurations in which the projection surface and/or other components form an integrated component may, for example, reduce maintenance costs or protect against environmental contamination (e.g., water, electrostatic discharge, etc.). In some embodiments, use of a projection surface that is rigid and/or integrated with other components of the projection button or projection button panel may make a separate button cap unnecessary.

Furthermore, although the projection surfaces shown in the Figures are substantially flat, some embodiments may include one or more projection surfaces that are not flat. For example, a projection surface may be domed (e.g., for additional strength) or may have an irregular shape. As another example, the projection surface may be reshaped dynamically (e.g., using vacuum forming).

The projection surface 120 is covered by the button cap 116. The button cap 116 shown in FIG. 1 is a substantially flat surface. However, in some embodiments, the button cap may be curved, domed, or have a different shape.

The button cap 116 may be made of materials such as plastic, acrylic, glass, etc. In some embodiments, the button cap 116 and the projection surface 120 may be physically coupled or may be the same physical component.

The projection button 100 shown in FIG. 1 is an electromechanical button, which is activated by physically depressing the button cap 116. Various activation mechanisms may be used with electromechanical buttons.

For example, the projection button 100 shown in FIG. 1 is a relatively small button that may operate with a single mechanical plunger. The mechanical plunger activates an electromechanical switch coupled with the button activation communications interface 124. The button activation communications interface 124 transmits a communication signal indicating a button press.

However, a different mechanical actuation mechanism, such as a 4-corner alignment pin mechanism, may be used in some embodiments. A 4-corner alignment pin mechanism may help stabilize a larger button and/or reduce one or more undesirable effects such as button rocking and/or image distortion.

Different types of actuation mechanisms may have various properties, advantages, or disadvantages. Accordingly, an actuation mechanism may be strategically selected based on the desired configuration of a given projection button or projection button panel. The types of actuation mechanisms may include, but are not limited to: capacitive touch screens, projected capacitive touch screens, projected infrared touch screens, planar scatter detection touch screens, acoustic pulse touch screens, dispersive signal touch screens, frustrated total internal reflection touch screens, resistive touch screens, and mechanical interruption of light beams (e.g., "horse shoe" optical actuators).

In the projection button 100 illustrated in FIG. 1, the projection surface 120 is coupled with the button cap 116 and moves with the button cap when the projection button is pressed. Movement by the projection surface 120 without corresponding movement of one or more other optical components (e.g., the lens 112, the button projector 104, etc.) may result in some amount of optical distortion. However, this distortion may be minimal and/or inconsequential. For example, a user may be unable to see the button image while pressing the button due to the intervening presence of the user's finger.

In different embodiments, only the button cap 116 (and associated actuation components) may move when the button is pressed. In this way, the projection surface 120 may remain fixed, thus maintaining relatively stable distances between the optical components of the projection button 100. In still different embodiments, the lens 112 and/or the button projector 104 may move with the button cap 116 and/or the projection surface 120 when the button is pressed, thus reducing optical distortion.

Although the projection button 100 shown in FIG. 1 is an electromechanical button, different embodiments may use an entirely different actuation mechanism, such as a touch panel disposed at the button surface. In this case, the projection button may have no (or few) moving parts. As another example, some embodiments may employ an electromagnetic sensor configured to sense the interruption of a magnetic field (e.g., by a human finger). The use of an electromagnetic sensor may allow a user to activate the projection button 100 without actually touching the button.

In one or more embodiments, one or more of the components of a projection button (e.g., one or more lenses, button projectors, projection surfaces, mirrors, etc.) may be adjustable. Adjustment may be advantageous if, for example, one or more optical components of a projection button loses focus or otherwise moves out of position. Further, a projection button that has one or more adjustable components may allow maintenance personnel to fine-tune the optical display properties of one or more projection buttons at a gaming machine in order to achieve a better button image. According to various embodiments, one or more components may be adjusted using a tool and/or an adjustment mechanism coupled with a component, such as an adjustment pin or lever.

In one or more embodiments, one or more of the components of a projection button (e.g., one or more lenses, button projectors, projection surfaces, mirrors, etc.) may be replaced. For example, a button projector (e.g., one that is broken or outdated) may be replaced with a different button projector. As another example, button cap may be replaced with a different button cap (e.g., one that has a different configuration or appearance). Accessing one or more components of a projection button may involve, for example, opening the door of a gaming machine, using a key, removing a switch, etc.

FIGS. 2-5 show diagrams representing various embodiments of a projection button. The diagrams of projection buttons shown in FIGS. 2-5 are simplified representations used to illustrate certain features of a projection buttons according to different embodiments. Thus, as is shown in FIG. 1, an actual projection button may include one or more components not illustrated in FIGS. 2-5, such as one or more communication interfaces.

Figure 2:
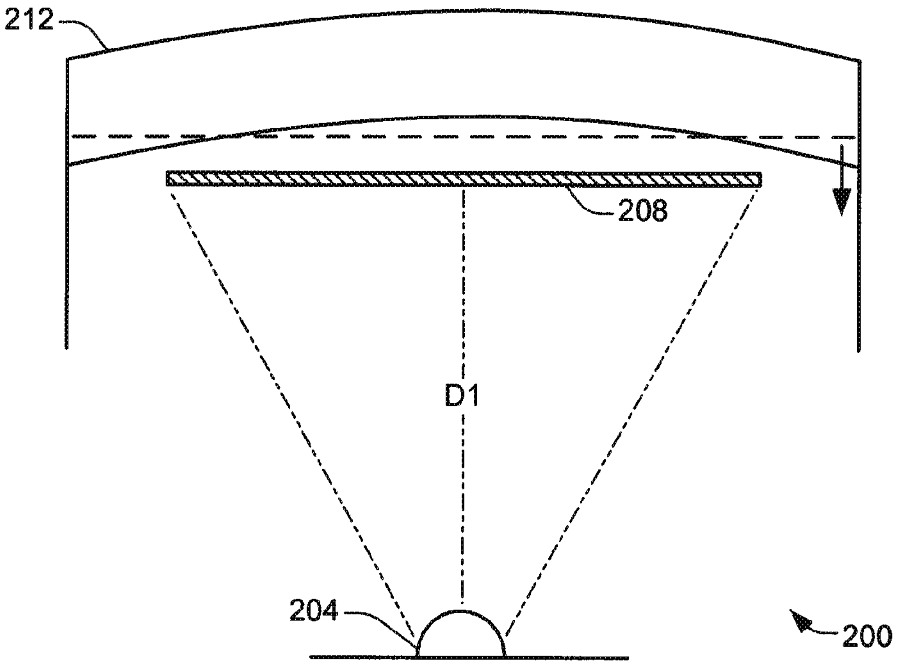
FIG. 2 shows a diagram representing a projection button, constructed in accordance with one embodiment of the present invention.

FIG. 2 shows a diagram representing a projection button, constructed in accordance with one embodiment of the present invention. The projection button 200 includes a button projector 204, a projection surface 208, and a button cap 212.

One or all of the components shown in FIG. 2 may be substantially similar or identical to other components described herein. For example, one or more of the button projector 204, the projection surface 208, and/or the button cap 212 may be substantially similar to the button projector 104, the projection surface 120, and/or the button cap 116 shown in FIG. 1.

When the projection button 200 is pressed, a sensor is activated that causes a signal to be transmitted. The button actuation mechanism associated with the projection button 200 may be substantially similar to the button actuation mechanism associated with the projection button 100 illustrated in FIG. 1. However, in different embodiments, a different actuation mechanism may be used.

The projection display 208 and button projector 204 shown in FIG. 2 are positioned within the projection button 200. In some embodiments, the projection surface 208 may be coupled with the button cap 212. Thus, the projection surface 208 and button cap 212 may form a removable button top assembly that can be placed over the button projector 204, which may be fixed to a button casing or a button panel.

In the projection button 200, the button projector 204 projects one or more images onto projection surface 208. The projection surface 208 is spaced from the button projector 204 to define a distance D1.

The optimal distance D1 may be strategically determined based on various factors such as the characteristics of the button projector 204 (e.g., resolution, intensity, dispersal spread, etc.), the characteristics of the button cap 212 (e.g., size, shape, etc.), and/or the characteristics of one or more different components associated with the projection button 200. For example, D1 may be any distance between 0.1 inches and 4 inches.

Figure 3:
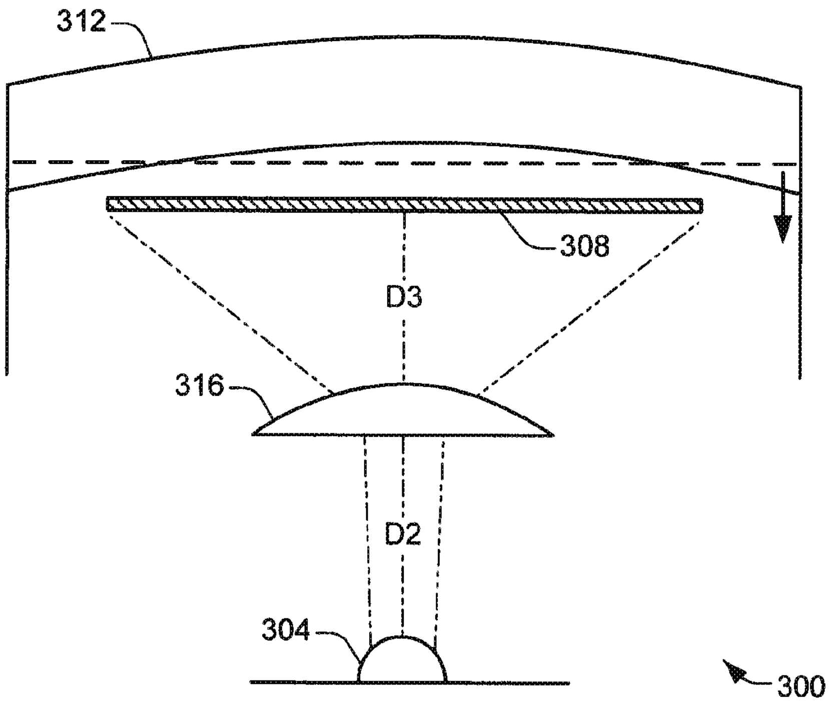
FIG. 3 shows a diagram representing a projection button, constructed in accordance with one embodiment of the present invention.

FIG. 3 shows a diagram representing a projection button, constructed in accordance with one embodiment of the present invention. The projection button 300 includes a button projector 304. The button projector 304 projects an image through a lens 316 onto a projection surface 308. The projection surface 308 is visible through a button cap 312.

One or all of the components shown in FIG. 3 may be substantially identical or similar to other components described herein. For example, one or more of the button projector 304, the projection surface 308, and/or the button cap 312 may be substantially similar to the button projector 104, the projection surface 120, and/or the button cap 116 shown in FIG. 1.

When the projection button 300 is pressed, a sensor is activated that causes a signal to be transmitted. The button actuation mechanism associated with the projection button 300 may be substantially similar to the button actuation mechanism associated with the projection button 100 illustrated in FIG. 1. However, in different embodiments, a different actuation mechanism may be used.

In the projection button 300, the button projector 304 projects one or more images onto the projection surface 308 through the lens 316. According to various embodiments, different types, numbers, and/or configurations of lenses may be used, depending on the desired optical effect. For example, the lens 316 may be a biconvex converging lens.

The lens 316 is spaced from the button projector 304 to define a distance D2. The projection surface 308 is spaced from the lens 316 to define a distance D3. The optimal distances D2 and D3 may be strategically determined based on various factors such as the characteristics of the button projector 304 (e.g., resolution, intensity, dispersal spread, etc.), the characteristics of the button cap 312 (e.g., size, shape, etc.), the characteristics of the lens 316 (e.g., size, focal length, etc.), and/or the characteristics of one or more other components associated with the projection button 300. Further, according to different embodiments, D2 and D3 may be the same or different values. For example, D2 and/or D3 may be any distance between 0.1 inches and 4 inches.

In one or more embodiments a projection button may be configured to interoperate with existing button hardware configurations. Some such existing configurations may leave a limited amount of space (e.g., 2.5 inches) for button hardware. Accordingly, one or more of the distances D1, D2, and D3 shown in FIGS. 2 and 3 may be strategically determined to allow a projection button to fit into a confined space. For example, the sum of the distances may be selected to be less than 1.5 inches (e.g., to allow space for other components).

In one or more embodiments, one or more of the distances D1, D2, and D3 shown in FIGS. 2 and 3 may be adjustable. For example, it may be possible to move one or more components shown in FIGS. 2 and 3 (e.g., by turning a pin, adjusting a lever, etc.).

Figure 4:
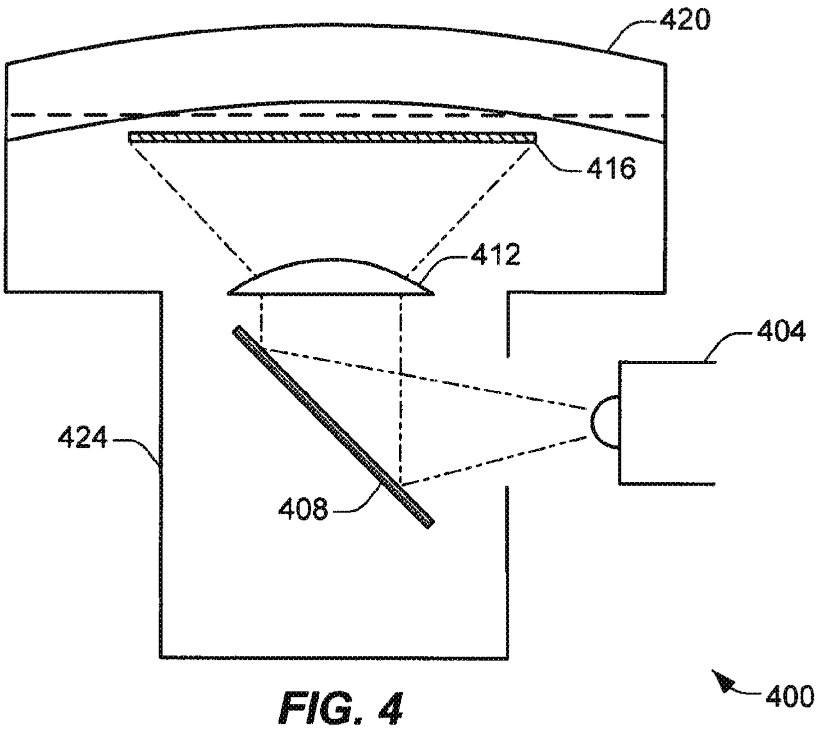
FIG. 4 shows a diagram representing a projection button, constructed in accordance with one embodiment of the present invention.

FIG. 4 shows a diagram representing a projection button, constructed in accordance with one embodiment of the present invention. Projection button 400 includes a button casing 424. A mirror 408, lens 412, projection surface 416, and button cap 420 are coupled with the button casing 424. A button projector 404 is located outside the projection button 400. The button projector 404 projects an image onto the mirror 408. The mirror 408 reflects the image through the lens 412 onto the projection surface 416. The image is visible through the button cap 420.

In some respects, the projection button 400 shown in FIG. 4 may be substantially similar to the projection buttons 200 and 300 shown in FIGS. 2 and 3. For example, one or more of the components shown in FIG. 4 may be substantially similar to those shown in FIGS. 2 and 3. Further, the projection of the image through the lens 412 and onto the projection surface 416 may be substantially similar to the use of the lens 316 and projection surface 308 illustrated in FIG. 3. However, in contrast to the projection button 300, the button projector 404 is located outside the button.

The image projected by the button projector 404 is reflected by mirror 408. The mirror 408 may be coupled with the projection button and/or the button projector 404 (e.g., to ensure a stable line of sight).

Although the mirror 408 is shown positioned at approximately a 45 degree angle, the actual angle of the mirror may be determined based on various factors. For example, if the button projector 404 is located higher or lower than is shown in FIG. 4, then the mirror 408 may be positioned at a lesser or greater angle than is shown in FIG. 4. Further, in some embodiments the angle of the mirror 408 may be adjustable. For example, the mirror 408 may be coupled with an adjustment pin that could be used to focus the image.

In some embodiments, locating the button projector 404 outside the button casing may allow a smaller button casing 424 than would be possible if the button projector 404 were located inside the button casing. Additionally, and/or alternately, replacing one or more components of the projection button may be easier when the button projector 404 is located outside the button casing 424. For example, it may be possible to exchange the button casing 424 and its associated components with a different button casing while leaving the button projector 404 in place.

As was discussed in relation to FIGS. 2 and 3, the distances between one or more components of the projection button (e.g., the button projector, lens, mirror, projection surface, etc.), the optical properties (e.g., lens focal length, opacity, etc.) of these components, and the location and orientation of these components may be strategically determined according to the specific characteristics of the actual projection button. For example, a larger projection surface may require a lens with a smaller focal length.

Figure 5:
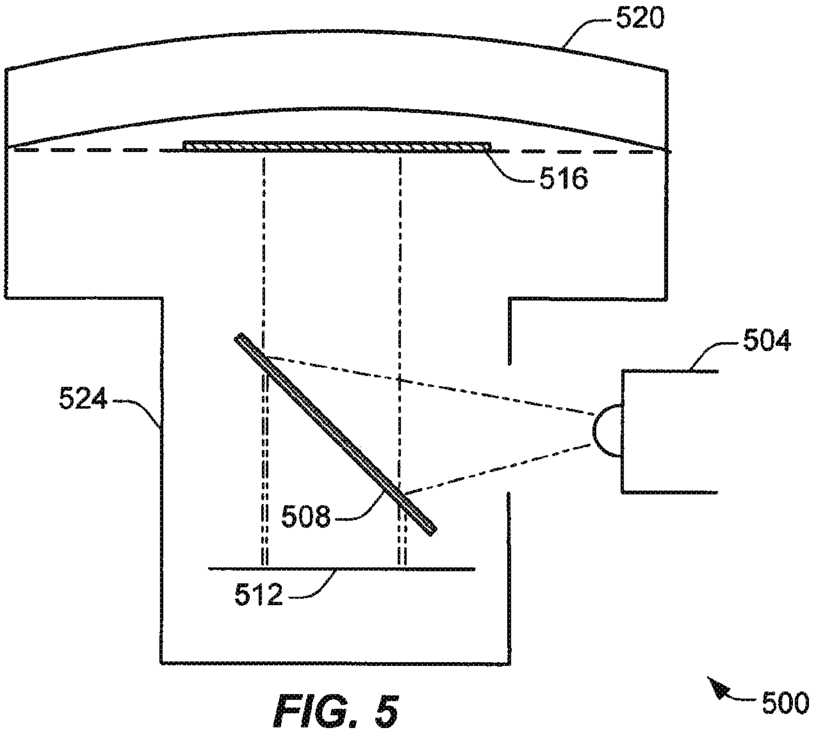
FIG. 5 shows a diagram representing a projection button, constructed in accordance with one embodiment of the present invention.

FIG. 5 shows a diagram representing a projection button, constructed in accordance with one embodiment of the present invention. Projection button 500 includes a button projector 504 that projects an image which is reflected by a two-way mirror 508 onto a projection surface 512. The image on the projection surface 512 is visible through a button cap 520 and a lens 516.

In some respects, the projection button 500 shown in FIG. 5 may be substantially similar to the projection buttons 400 shown in FIG. 4. For example, one or more of the components shown in FIG. 5 may be substantially similar to those shown in FIG. 4. However, in contrast to the projection button 400, the projection button 500 includes an image projected onto a projection surface 512 from above the projection surface 512.

This is achieved by use of the two-way mirror 508. The two-way mirror 508 may be any surface capable of reflecting light received on one side through the surface while freely transmitting (or substantially transmitting) light received from the other surface.

The image projected by the button projector 504 and reflected by the two-way mirror 508 is projected onto the projection surface 512. The image projected onto the projection surface 512 is visible at the button cap 520 through the lens 516 and through the two-way mirror 508, which is substantially transparent to light transmitted from below.

As discussed herein, projection surfaces are at least partially opaque so as to receive and display a projected image. In some embodiments, as shown in FIGS. 1-4, an image may be projected from behind a projection surface. This technique may create some amount of optical distortion, since the projected light must pass through the projection surface.

Such distortion may be reduced or eliminated according to the techniques shown in FIG. 5, since the image is projected onto the projection surface 512 from the same side on which they button image is viewed. This may allow the use of a substantially opaque projection surface 512 since light need not pass through the projection surface.

Depending on the optical techniques used, the button image generated using this front-projection technique may appear to be generated on the back of the button. Thus, it is anticipated that a front-projection technique may be useful for relatively large and/or flat buttons. However, a front-projection technique may be used with various sizes and/or shapes of projection buttons.

Although the two-way mirror 508 is shown positioned at approximately a 45 degree angle, the actual angle of the two-way mirror may be determined based on various factors. For example, if the button projector 504 is located higher or lower than is shown in FIG. 5, then the two-way mirror 508 may be positioned at a lesser or greater angle than is shown in FIG. 5. Further, in some embodiments the angle of the two-way mirror 508 may be adjustable. For example, the two-way mirror 508 may be coupled with an adjustment pin that could be used to focus the image.

As was discussed in relation to FIGS. 2 and 3, the distances between one or more components of the projection button (e.g., the button projector, mirrors, projection surface, etc.), the optical properties (e.g., lens focal length, opacity, etc.) of these components, and the location and orientation of these components may be strategically determined according to the specific characteristics of the actual projection button.

It should be noted that the projection buttons shown in FIGS. 1-5 are only example embodiments, and that the current disclosure extends to projection buttons having configurations not shown in FIGS. 1-5. In some embodiments, for example, the projection button shown in FIG. 5 could include a lens in addition to the two-way mirror 508. Further, where embodiments described herein show only a single instance of a particular component (e.g., a button projector, a lens, a mirror, a projection surface, etc.), it should be noted that some embodiments may employ a plurality of one or more of these or other components. For example, one or more embodiments may employ two or more lenses, two or more projection buttons, etc.

Figure 6:
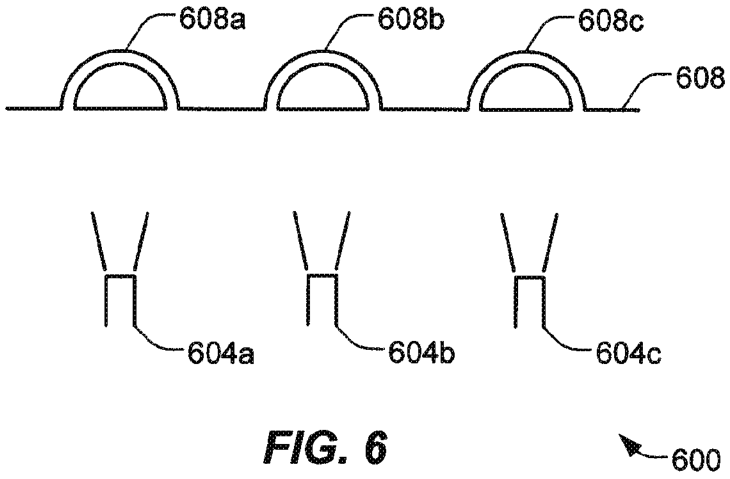
FIG. 6 shows a diagram representing a projection button panel, constructed in accordance with one embodiment of the present invention.

FIG. 6 shows a diagram representing a projection button panel, constructed in accordance with one embodiment of the present invention. The diagram of projection button panel 600 shown in FIG. 6 is a simplified representation used to illustrate certain features of a projection button according to at least one embodiment. Thus, an actual projection button panel may include one or more components not illustrated in FIG. 6.

According to various embodiments, the projection button panel 600 may be coupled with a gaming machine in various ways. In some embodiments, the projection button panel 600 may be a component integrated with a gaming machine. For example, the projection button panel 600 may be positioned below a primary game display, on a player tracking panel, on a top box, on a door of the gaming machine, etc. In some embodiments, the projection button panel 600 may be a separate component mounted to the gaming machine (e.g., outside the gaming machine cabinet). In some embodiments, the projection button panel 600 may be a separate component in communication with the gaming machine but mounted elsewhere. For example, the projection button panel 600 may be mounted to an armrest that attaches to the gaming machine, to a chair or stool positioned near the gaming machine, or to a stand-alone console near the gaming machine. Furthermore, the projection button panel 600 may be used in conjunction with other devices, such as kiosks, cashier's terminals, player tracking terminals, etc.

The projection button panel 600 includes button projectors 604*a*, 604*b*, and 604*c*. The projection button panel 600 also includes button cap panel 608, which includes button caps 608*a*, 608*b*, and 608*c*. In one or more embodiments, the projection button panel 600 may be used to provide user input at a gaming machine.

Button cap panel 608 may be positioned over button projectors 604*a*, 604*b*, and 604*c*. Each button cap 608*a*, 608*b*, and 608*c* includes a projection surface to display one or more images projected by one or more underlying button projectors. Further, each button cap 608*a*, 608*b*, and 608*c* may include one or more sensors for determining when a button has been pressed and/or one or more communications interfaces for transmitting an indication that the button has been pressed According to different embodiments, various mechanisms may be used to affix the button cap panel 608 in position over the button projectors 604*a*, 604*b*, and 604*c*. For example, the button cap panel 608 may be attached using one or more snaps, bolts, screws, locks, etc.

In some embodiments, the button cap panel 608 may be removable. For example, a casino employee or service person may be able to remove a button cap panel positioned over button projectors on a gaming machine. In this example, removal of the button cap assembly may require one or more keys or special tools to inhibit tampering with the projection button panel by unauthorized individuals.

A projection button panel configured or designed to include a removable button cap panel may permit easier and/or cheaper servicing and/or maintenance of the projection button panel. For example, defective parts (e.g., sensors, mechanical actuators, touch screens, button projectors, etc.) could be replaced with working parts. As another example, old or outdated parts could be replaced with updated parts.

A projection button panel configured or designed to include a removable button cap panel may also allow the projection button panel to be more configurable than would be the case without a removable button cap panel. In one or more embodiments, a button cap panel could be removed and replaced with a different button cap panel having a different number, size, shape, or configuration of button caps. For example, a button cap may be an oval, triangle, circle, square, rectangle, or any other shape.

In one or more embodiments, the components included in the button cap panel 608 may be relatively inexpensive compared to the button projectors 604*a*, 604*b*, and 604*c*. Thus, separating the button panel components from the button projectors may significantly reduce costs associated with construction, maintenance, and/or configuration of the projection button panel.

According to various embodiments, different numbers, configurations, sizes, types, and shapes of button caps may be used. Further, it is not necessary that all button caps cover projector buttons. For example, some button caps may cover conventional video display buttons or even fixed display buttons. As another example, some button caps may cover and/or incorporate one or more touch screen elements.

According to various embodiments, different numbers, configurations, sizes, types, and shapes of button projectors may be used. Further, it is not necessary that all button projectors present in the projection button panel be covered by button caps. For example, in order to accommodate one or more games in which fewer buttons are needed, a projection button assembly may include a button cap panel that includes one or more substantially opaque sections that shields from view one or more button projectors.

Figure 7:
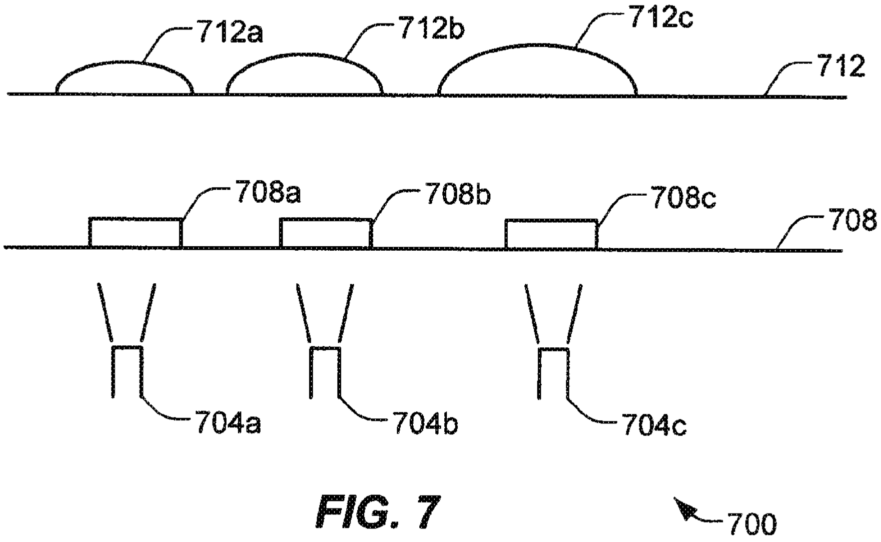
FIG. 7 shows a diagram representing a projection button panel, constructed in accordance with one embodiment of the present invention.

FIG. 7 shows a diagram representing a projection button panel, constructed in accordance with one embodiment of the present invention. The diagram of projection button panel 700 shown in FIG. 7 is a simplified representation used to illustrate certain features of a projection button according to at least one embodiment. Thus, an actual projection button panel may include one or more components not illustrated in FIG. 7.

The projection button panel 700 includes button projectors 704*a*, 704*b*, and 704*c*. The projection button panel 700 also includes an intermediate button panel 708, which includes intermediate button assemblies 708*a*, 708*b*, and 708*c*. The intermediate button panel 708 may be positioned over button projectors 704*a*, 704*b*, and 704*c*. The projection button panel 700 also includes a button cap panel 712, which includes button caps 712*a*, 712*b*, and 712*c*. The button cap panel 708 may be positioned over intermediate button panel 708.

Figure 8:
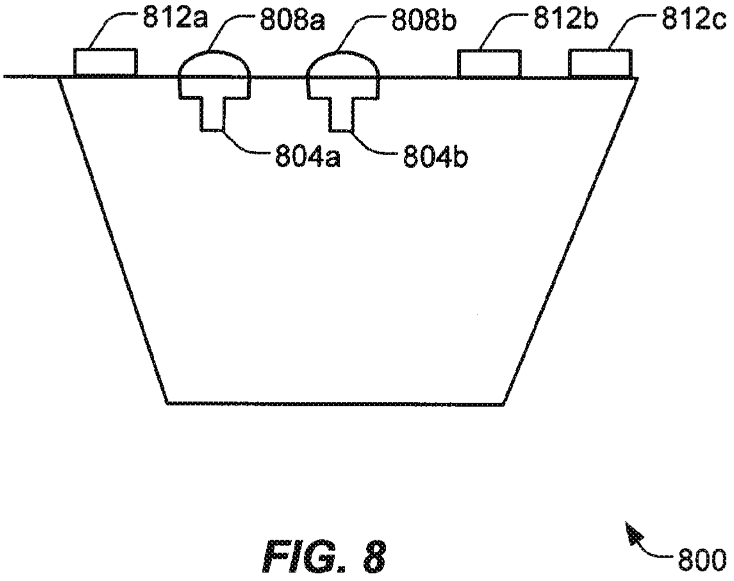
FIG. 8 shows a diagram representing a side view of a button panel, constructed in accordance with one embodiment of the present invention.

In many ways, the projection button panel 700 shown in FIG. 7 may be substantially similar to the projection button panel 800 shown in FIG. 8. However, in contrast to FIG. 8, FIG. 7 shows a projection button panel 800 in which the button caps are separate from one or more intermediate button components, such as one or more electromechanical sensors, lenses, etc.

Each intermediate button assembly 708*a*, 708*b*, and 708*c* includes one or more sensors configured to transmit, when the respective button is pressed, a signal indicating that the respective button has been activated. In the projection button panel 700 illustrated in FIG. 7, each intermediate button assembly also includes a projection surface to display one or more images projected by one or more underlying button projectors.

However, in different embodiments, one or more button caps may include a projection surface to display one or more images projected by one or more underlying button projectors. For example, the intermediate button panel 708 may include one or more transparent or substantially transparent sections to transmit light emitted by one or more underlying button projectors.

According to different embodiments, various mechanisms may be used to affix the intermediate button panel 708 and/or button cap panel 712 in position over the button projectors 704*a*, 704*b*, and 704*c*. For example, the button cap panel 708 may be attached using one or more snaps, bolts, screws, and/or locks.

In some embodiments, one or more of the intermediate button panel 708 and the button cap panel 712 may be removable. For example, a casino employee or service person may be able to remove a button cap panel positioned over button projectors on a gaming machine. In this example, removal of the button cap assembly 712 and/or intermediate button panel 708 may require one or more keys or special tools to inhibit tampering with the projection button panel by unauthorized individuals.

A projection button panel configured or designed to include a removable intermediate button panel and/or button cap panel may permit easier and/or cheaper servicing and/or maintenance of the projection button panel. For example, defective parts (e.g., sensors, mechanical actuators, touch screens, button projectors, etc.) could be replaced with working parts. As another example, old or outdated parts could be replaced with updated parts.

Additionally, or alternately, a projection button panel configured or designed to include a removable a removable intermediate button panel and/or button cap panel may allow the projection button panel to be more configurable than would be the case if one or more panels were not removable. For example, a button cap panel could be removed and replaced with a different button cap panel having a different number, size, shape, or configuration of button caps. As another example, an intermediate button panel could be removed and replaced with a different intermediate button panel having a different number, size, shape, or configuration of intermediate button assemblies.

In one or more embodiments, the button cap panel 712 may include one or more lenses or other optical components designed to display the projected images at a size appropriate for the button caps in the button cap panel 712. Thus, a replacement button cap panel having button caps of sizes and/or shapes that are different from the original button cap panel may still display projected images in a manner appropriate to the button caps in the replacement button cap panel.

According to various embodiments, different numbers, configurations, sizes, types, and shapes of button caps, button projectors, and intermediate button assemblies may be used. For example, as is illustrated in FIG. 7, button caps may be of different sizes. As another example, one or more intermediate button assemblies may be larger or smaller than other intermediate button assemblies (e.g., to accommodate a larger or smaller button cap).

Further, it is not necessary that the projection button panel 700 have a 1 to 1 to 1 correspondence between button caps, intermediate button assemblies, and button projectors. For example, a single button cap may be used to cover a plurality of intermediate button assemblies and/or button projectors. As another example, a single intermediate button assembly may be used to cover a plurality of button projectors. As yet another example, some button caps may cover conventional video display buttons, fixed display buttons, or one or more touch screen elements.

FIG. 8 shows a diagram representing a side view of a button panel, constructed in accordance with one embodiment of the present invention. Button panel 800 includes projection button assemblies 804*a* and 804*b*, which are coupled to projection button caps 808*a* and 808*b*. Button panel 800 also includes conventional buttons 812*a*, 812*b*, and 812*c*.

As is illustrated in FIG. 8, in some embodiments projection buttons may be used in conjunction with conventional buttons in a button panel 800 on a gaming machine. For example, user input options that often have a fixed function and label, such as a "Deal" button, may correspond to one or more conventional static buttons, while user input options corresponding to game-specific options may be provided by one or more projection buttons.

Further, projection buttons according to one or more embodiments described herein may be used in conjunction with a button panel 800 designed for other types of buttons (e.g., one or more button panel 800*s* available from IGT, Inc., of Reno, Nev.). The IGT button panel 800 can be fitted into the various IGT gaming machine platforms.

According to various embodiments, the button panel 800 may be mounted to the gaming machines in various ways. In one or more embodiments, the gaming machine includes a front door mounted to a gaming machine cabinet. The machine also includes a main display, which shows outcomes of games played by the player.

In one or more embodiments, such as the G22 machine or the SAVP machine available from IGT, the button panel 800 may be mounted directly to the front door of the machine, in an armrest portion of the door. In other embodiments, such as the BC-20 machine available from IGT, the button panel 800 may be mounted to a separate armrest casing, which is attached to and protrudes from the front door. In the BC-20 machine, the armrest casing may encase inner components of the button panel 800.

Figure 12:
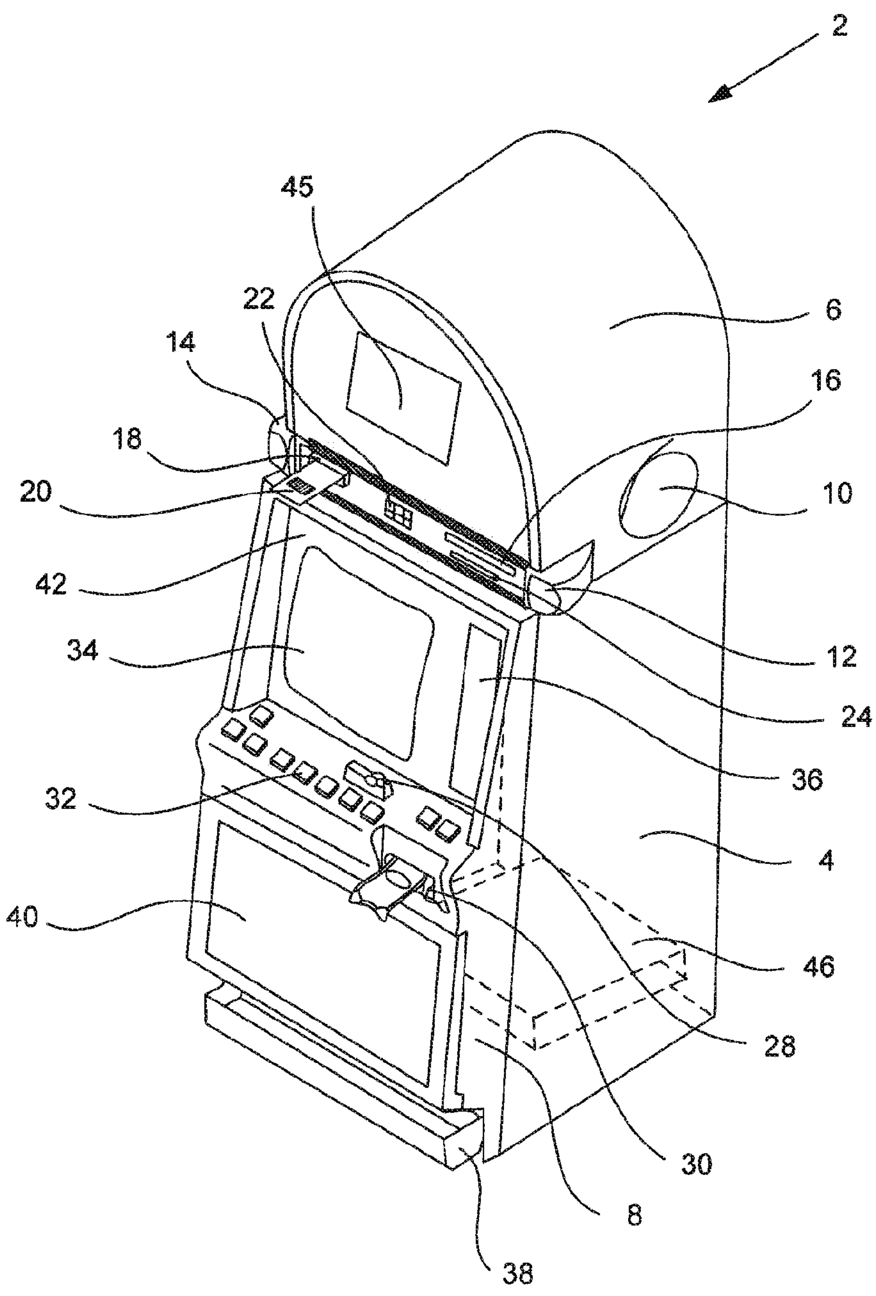
FIG. 12 shows a perspective view of a gaming machine, constructed in accordance with one embodiment of the present invention.

An example of a gaming machine that may include a button panel similar to the button panel 800 is gaming machine 2 shown in FIG. 12. The gaming machine 2 will be discussed in greater detail in subsequent passages of this specification.

In one or more embodiments, the front door may open to provide access to an interior region of the cabinet. When the button panel 800 is attached to the front door, either directly or indirectly, the button panel 800 moves with the front door when the door is opened.

In one or more embodiments, the button panel 800 may include a plurality of mechanical projection buttons mounted to the button panel 800, and protective lenses exposed through openings in the button panel 800. A player can press the exposed portion of the protective lens to actuate a switch inside the projection button, as discussed herein. A button projector situated under the protective lens of a projection button may display, for example, a legend that identifies the projection button's function.

However, it should be noted that the projection button does not necessarily include a mechanical actuator. For example, one or more projection buttons associated with the button assembly may alternately, or additionally, include a touch sensor, electromagnetic sensor, or any other sensor for detecting user input.

One or more projection buttons may be connected along a strip of ribbon cable. One or more projection button may interface with a respective ribbon cable PCB connector on the ribbon cable. Each ribbon cable PCB connector on the ribbon cable may have a specific address, so different projection buttons are separately addressable.

The ribbon cable may be connected at one end to a panel configuration board. The panel configuration board may be electrically connected to a controller, such as the "Black-Fin" controller available from IGT, by an cable (e.g., an HDMI cable). The panel configuration board may have DIP switches, which identify the button panel 800 configuration.

The panel configuration board may provide signals carried on the ribbon cable to the cable that lead to the Black-Fin controller. The panel configuration board may also communicate the configuration of the button panel 800 as governed by the DIP switches. The Black-Fin controller may control the dynamic buttons via the panel configuration board and, In one or more embodiments, may control other devices of the gaming machine, such as bonus wheels. The Black-Fin controller may also be connected to the gaming machine processor.

In one or more embodiments, the Black-Fin controller may can be mounted to the gaming machine door or in the interior of the gaming machine cabinet. The panel configuration board may be mounted to the front door (e.g., connected to one end of the ribbon cable).

In one or more embodiments, the ribbon cable may have PCB connectors spaced along its length. Each ribbon cable PCB connector may interface with a respective projection button. In particular, the connection may be made between the ribbon cable PCB connector and a counterpart button interface integral with the projection button.

The addressed PCB connectors on the ribbon cable may be spaced apart from one another along the length of the ribbon cable. The PCB connectors on the ribbon cable may connect to the respective interfaces on the rear sides of the projection buttons. In one or more embodiments, the ribbon cable PCB connector may be manually unplugged from its respective button interface.

In some instances, when a button panel 800 in a gaming machine is replaced, the entire assembly, including the projection buttons, all of the components internal to the projection button, and the ribbon cable (including ribbon cable PCB connectors) are removed from the machine and replaced. In other instances, however, the ribbon cable PCB connectors are unplugged from their respective button interfaces and connected to a set of replacement projection buttons. Thus, in some button panel 800 replacements, the same ribbon cable and PCB connectors may be used with both the original projection buttons and the replacement projection buttons.

Each projection button may include a button projector and projection surface, which may be covered by a protective lens. The button projector and projection surface may be seated in an actuator, which, in turn, may be seated in a button casing. The protective lens may attach to the actuator. A circular PCB may be securely mounted within a rear channel of the button casing, and may interfaces with the button projector by virtue of an interface card. The PCB may have a switch mounted on one side, facing the actuator. Thus, the PCB may be referred to herein as the "switch-mounted PCB." The button interface may be mounted directly to the switch-mounted PCB on the opposite side of the switch.

In one or more embodiments, a mounting piece or bezel may frame the button casing, and a locking nut may screw onto the rear channel of the button casing to secure the bezel and the button casing to a button panel 800 of the machine. In particular, the button panel 800 may be situated between the bezel and a lip portion of the button casing. Thus, screwing the nut onto the channel may tighten the button panel 800 between the button casing lip and the bezel.

In one or more embodiments, a spring may be disposed between the actuator and the button casing. In its natural, uncompressed state, the spring holds the actuator in an elevated position above the switch. A user pressing on the protective lens causes the spring to compress, as the protective lens and the actuator move towards the switch-mounted PCB. The button casing may be held in place with respect to the button panel 800 by the nut and the bezel. The switch-mounted PCB may also be held in place by virtue of being secured within the rear channel of the button casing. And the button projector may be held in place by virtue of its mounting to the button casing. In this way, pressing of the protective lens causes the actuator to actuate the switch. Actuation of the switch causes a signal to be sent to the Black-Fin controller via the ribbon cable PCB connector, ribbon cable, and the panel configuration board.

In some embodiments, one or more projection buttons may interoperate with electronic controls and/or sockets for conventional buttons. Thus, conventional video display buttons may be individually replaced with projection buttons (e.g., as the conventional buttons wear out). This may allow the advantages of using new projection buttons without the attendant cost of replacing all buttons at once.

Figure 9:
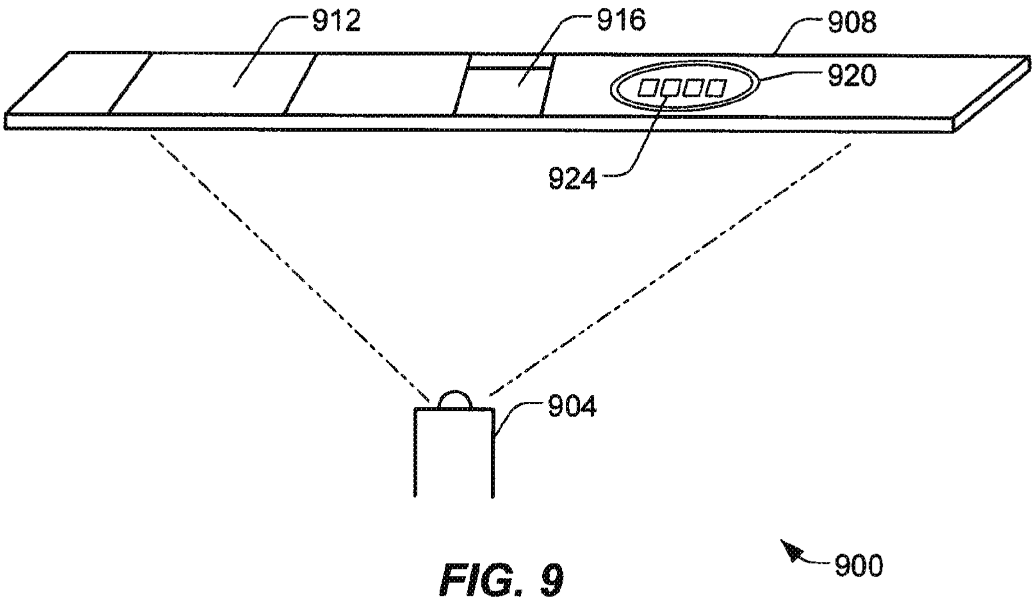
FIG. 9 shows a diagram representing a side view of a touch screen projection button panel, constructed in accordance with one embodiment of the present invention.

FIG. 9 shows a diagram representing a side view of a touch screen projection button panel, constructed in accordance with one embodiment of the present invention.

Touch screen projection button panel 900 includes a button projector 904, which is positioned beneath a touch screen 908. The touch screen 908 includes touch screen segments 912 and 916. One or more projection buttons 924 are surrounded by light piping 920.

The button projector 904 may project one or more images onto the touch screen 908. For example, the button projector 904 may project one or more images associated with a button. As another example, the button projector 904 may project one or more images associated with information presented in associated with the presentation of a wager-based game. The button projector 904 may be substantially similar to other button projectors described herein, such as for example the button projector 104 illustrated in FIG. 1.

The touch screen 908 shown in FIG. 9 is a single, flat sheet. However, according to various embodiments, various types of touch screens may be used. For example, one or more curved, bent, angled, or otherwise irregularly shaped touch screens may be used. In some embodiments, the use of a button projector 904 rather than a conventional video display for creating a touch screen display may significantly reduce costs and/or engineering difficulty, since using a button projector may eliminate the need for including a video display.

In some embodiments, the touch screen 908 includes a layer that is partially opaque. Such a layer may function as a projection surface, similar to other projection surfaces discussed herein. Thus, light may be projected onto the layer from the button projector 904 so as to be visible at the surface of the touch screen 908.

As is shown in FIG. 9, the touch screen 908 may be divided into touch screen segments, such as touch screen segments 912 and 916. In some embodiments, each touch screen segment may be a separate button, video display area, image display area, etc. Although only two touch screen segments are shown in FIG. 9, various embodiments may include any number of touch screen segments. Dividing the touch screen 908 into segments may assist in creating the impression of having different buttons on the touch screen.

In one or more embodiments, the divisions between touch screen segments may be a visual effect generated by the button projector 904. For example, the button projector 904 may display distinct images or videos in different segments of the touch screen 908. This may allow one or more projection buttons to be dynamically reconfigured. For example, projection buttons of different sizes or shapes could be created by the button projector 904 so as to correspond to the wager-based game being played.

In one or more embodiments, one or more buttons 924 may be highlighted by light piping 920. Light piping 920 may be illuminated by the button projector 904. Light may be routed to the light piping 920 from the button projector using, for example, laser projection, fiber optic cables, or other light directing techniques. Alternately, or additionally, light piping 920 may be coupled with a light source to generate a lighted effect at the surface of the button panel.

In some embodiments, light piping 920 may be physically raised from the surface of the touch screen 908. Alternately, light piping 920 may be inset or flush with the surface of the touch screen 908.

Light piping 920 may be used to focus a player's attention on one or more buttons, to indicate game state, to attract users, or for any other purpose. For example, light piping 920 may be illuminated at appropriate times to indicate that one or more buttons are activated and/or important. As another example, light piping 920 may be illuminated whenever the gaming machine is in operation to indicate one or more particularly important buttons (e.g., a Deal/Draw button).

Alternately, or additionally, the divisions between touch screen segments may physical divisions associated with the touch screen and/or may be created by placing a physical barrier on top of the touch screen (e.g., stickers, silk-screen, etc.).

In some embodiments, one or more portions of the touch screen (e.g., one or more of touch screen segments 912 and 916) may be designed and/or configured to not display images. For example, one or more portions of the touch screen 908 may be formed of a opaque or substantially opaque material. As another example one or more portions of the touch screen may be covered by an opaque or substantially opaque material (e.g., a sticker). As yet another example, the button projector 904 may be configured to display one or more blank segments on the touch screen 908.

Although only a single button projector 904 is shown in FIG. 9, some embodiments may include a plurality of button projectors. For example, different button projectors may be positioned beneath different portions of the touch screen 908. As another example, one or more button projectors 104 may be positioned beneath overlapping portions of the touch screen 908. As yet another example, multiple button projectors may be positioned to generate at least partially duplicative button images (e.g., to increase the brightness of the images).

Further, although only a single touch screen component is shown in FIG. 9, some embodiments may include a plurality of touch screens. For example, one or more button projectors may be configured to project light onto a plurality of different touch screen that are physically separated (e.g., on the surface of a gaming machine).

Also, although the touch screen shown in FIG. 9 is flat, some embodiments may include one or more touch screens of a different shape. For example, a touch screen may have one or more raised-surface touch buttons. As another example, a touch screen may have one or more dynamically-shaped buttons (e.g., using vacuum pressure).

Figure 10:
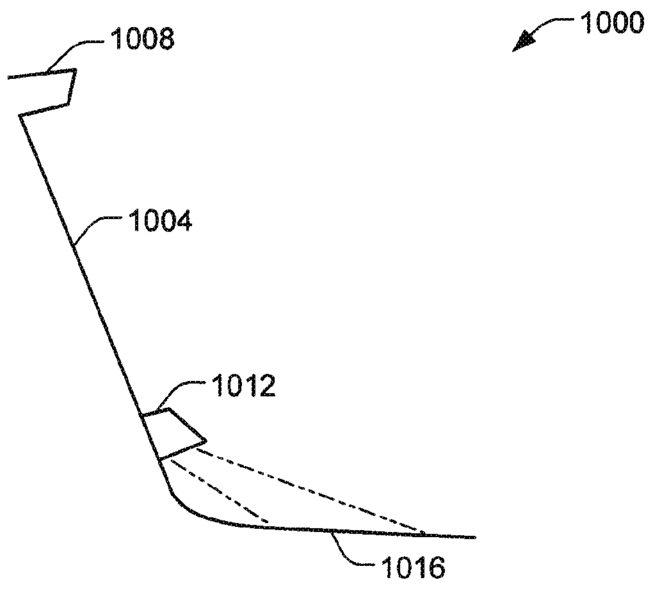
FIG. 10 shows a diagram representing a side view of a gaming machine display area including a projection button panel, constructed in accordance with one embodiment of the present invention.

FIG. 10 shows a diagram representing a side view of a gaming machine display area, constructed in accordance with one embodiment of the present invention. The gaming machine display area 1000 includes display 1004, top bezel 1008, bottom bezel 1012, and projection button panel 1016. The diagram of the gaming machine display area 1000 shown in FIG. 10 is a simplified representation used to illustrate certain features of a gaming machine display area according to at least one embodiment. Thus, an actual gaming machine display area may include one or more components not illustrated in FIG. 10.

The gaming machine associated with gaming machine display area 1000 may be used to display any type of wager-based game, such as, video poker, video blackjack, keno, bingo, etc. Additional details regarding wager-based gaming machines are discussed herein, for example with respect to FIG. 13.

The display 1004 may be any type of display used in a gaming machine. For example, the display 1004 may be a video display (e.g., an LCD display, an CRT display, an LED display, an OLED display, etc.). As another example, the display 1004 may be a clear sheet through which conventional mechanical slot reels or other mechanical gaming machine components may be viewed.

The top bezel 1008 and bottom bezel 1012 may be any type of fixture located at the edge of the display 1004. In one or more embodiments, the top bezel 1008 and/or bottom bezel 1012 may include lighting, stickers, or other display features. In addition, or alternately, the top bezel 1008 and/or bottom bezel 1012 may serve to protect the display 1004 (e.g., by forming a seal at the edge of the display 1004).

In one or more embodiments, the bezel may include one or more components associated with generating a touch screen surface for operation of the one or more projection buttons. For example, the bezel may include an infrared emitter and/or infrared sensor for detecting user input. In such an embodiment, a projection button panel may be generated on a variety of surfaces (e.g., a table, bar top, etc.).

Although the gaming machine display area 1000 illustrated in FIG. 10 includes only a top bezel 1008 and a bottom bezel 1012, some embodiments (not shown) may include one or more side bezels in addition to, or instead of, a top bezel and/or bottom bezel. Further, although the top bezel 1008 and bottom bezel 1012 illustrated in FIG. 10 are shown as raised from the surface of the gaming machine and display 1004, some embodiments (not shown) may include one or more bezels that are flush or substantially flush with the surface of the gaming machine and/or display.

As shown in FIG. 10, the bottom bezel 1004 includes one or more button projectors for projecting one or more images onto the projection button panel 1016. The one or more button projectors included in the bottom bezel 1004 may be substantially similar to other button projectors described herein, such as for example the button projector 104 illustrated in FIG. 1. According to different embodiments, various numbers, types, and/or configures of button projectors may be used.

The projection button panel 1016 may include any type, number, shape, size, color, and/or configuration of buttons. Further, the projection button panel 1016 may include one or more mechanical buttons, touch screen buttons, etc. In some embodiments, the projection button panel 1016 may be substantially similar to other button panels described herein, such as for example button panel 800 shown in FIG. 8 and/or touch screen 908 shown in FIG. 9.

One or more of the buttons on the projection button panel 1016 include a projection surface for displaying one or more images generated by one or more button projectors. The projection surface may be any surface suitable for receiving and displaying an image projected by the one or more button projectors included in the bottom bezel 1004. In order to display the projected image, the projection surface may be at least partially opaque.

For example, the projection surface may be a partially opaque surface associated with a touch screen. As another example, the projection surface may be a partially opaque surface on a mechanical button. In this way, the button panel 1016 may include dynamic buttons without requiring that a display mechanism be included in or behind the button panel itself.

Including one or more button projectors in a gaming machine bezel as opposed to beneath the projection button panel may reduce impact on the button projectors due to repeated pressing of the buttons. Such positioning may also ease the engineering constraints inherent in positioning button projectors beneath a button panel by reducing the thickness of the button panel, reducing the number and/or complexity of the electrical and/or mechanical components, etc. Additionally, or alternately, such positioning may create an interesting visual experience for the user.

Figure 11:
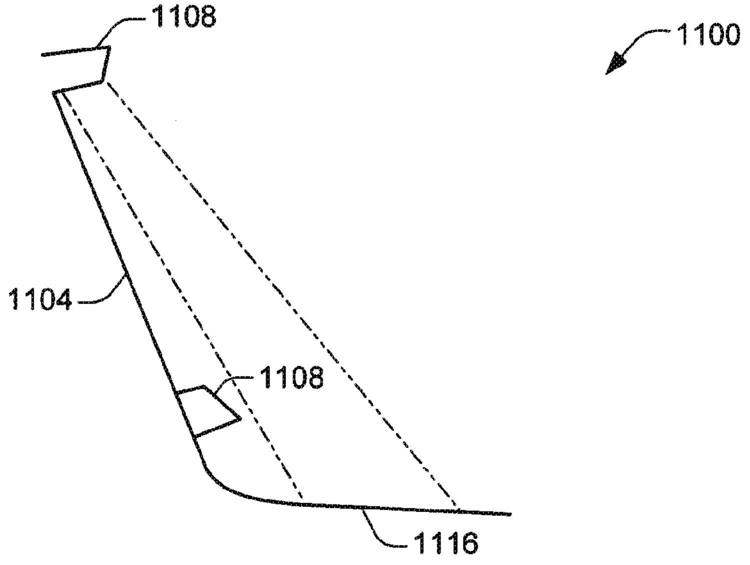
FIG. 11 shows a diagram representing a side view of a gaming machine display area including a projection button panel, constructed in accordance with one embodiment of the present invention.

FIG. 11 shows a diagram representing a side view of a gaming machine display area, constructed in accordance with one embodiment of the present invention. The gaming machine display area 1100 includes a display 1104, a top bezel 1108, a bottom bezel 1112, and a projection button panel 1116. One or more components illustrated in FIG. 11 may be substantially similar to the corresponding components illustrated in FIG. 10. For example, the projection button panel 1116 may be substantially similar to the projection button panel 1016 illustrated in FIG. 10. As another example, the display 1104 may be substantially similar to the display 1004 illustrated in FIG. 10.

In contrast to FIG. 10, gaming machine display area 1100 illustrated in FIG. 11 includes one or more button projectors in the top bezel 1108. In some embodiments, including one or more button projectors in the top bezel may help reduce optical distortion associated with the projected button images, since a button projector located in the top bezel may project light onto the button panel 1116 at an angle closer to vertical than when light is projected from the bottom bezel 1108.

FIGS. 10 and 11 show embodiments in which one or more button projectors are located in the top bezel and bottom bezel, respectively. However, in different embodiments (not shown), a gaming machine may include one or more button projectors in a side bezel or other location around the gaming machine. Additionally, and alternately, a gaming machine may include one or more button projectors in two different locations. For example, a gaming machine may include one or more button projectors in both the top and bottom bezel. Such a configuration may, for example, provide a unique visual experience to the user and/or ensure that button images continue to be displayed on the button panel even if the line of sight between one or more button projectors and the button panel is totally or partially interrupted.

As is shown in FIGS. 10 and 11, some embodiments may include one or more projectors that project a button image onto a surface at an oblique angle. An image projected onto a surface at an oblique angle may suffer from distortion such as keystoning unless such distortion is corrected. However, one or more embodiments may be configured to correct such distortion using hardware (e.g., one or more lenses) and/or software (e.g., by transforming the image).

Furthermore, one or more projectors may be configured to project images other than button labels. For example, a projector may project signage, game information, promotional information, or any other information onto various surfaces of the gaming machine.

Gaming Machine

FIG. 12 shows a perspective view of a gaming machine 2, constructed in accordance with one embodiment of the present invention. The gaming devices and gaming functions described with respect to at least FIG. 12 may be used in conjunction with one or more of the projection button techniques described above with respect to FIGS. 1-11.

As illustrated in the example of FIG. 12, machine 2 includes a main cabinet 4, which generally surrounds the machine interior and is viewable by users. The main cabinet includes a main door 8 on the front of the machine, which opens to provide access to the interior of the machine.

In one embodiment, attached to the main door is at least one payment acceptor 28 and a bill validator 30, and a coin tray 38. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 46 or another logic device coupled to the gaming machine determines the amount of funds entered and displays the corresponding amount on the credit or other suitable display as described above.

In one embodiment attached to the main door are a plurality of player-input switches or buttons 32. The input switches can include any suitable devices which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play. In some embodiments, one or more of the play buttons may be a projection button.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with the present invention are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive overlay to enable for player interaction with the images on the display. The images visible on the touch-screen may be generated by a button projector, in accordance with the techniques described herein. A player may make decisions and input signals into the gaming machine by touching the touch-screen at the appropriate places.

In one embodiment, the gaming machine may further include a plurality of communication ports for enabling communication of the gaming machine processor with external peripherals, such as external video sources, expansion buses, game or other displays, an SCSI port or a key pad.

As seen in FIG. 12, viewable through the main door is a video display monitor 34 and an information panel 36. The display monitor 34 will typically be a cathode ray tube, high resolution flat-panel LCD, SED based-display, plasma display, a television display, a display based on light emitting diodes (LED), a display based on a plurality of organic light-emitting diodes (OLEDs), a display based on polymer light-emitting diodes (PLEDs), a display including a projected and/or reflected image or any other suitable electronic device or display. The information panel 36 or belly-glass 40 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, a rectangle or an elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 30, player-input switches 32, video display monitor 34, and information panel are gaming devices that may be used to play a game on the game machine 2. According to a specific embodiment, the devices may be controlled by code executed by a master gaming controller 46 housed inside the main cabinet 4 of the machine 2. The master gaming controller may include one or more processors including general purpose and specialized processors, such as graphics cards, and one or more memory devices including volatile and non-volatile memory. The master gaming controller 46 may periodically configure and/or authenticate the code executed on the gaming machine.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Games Played

Many different types of games, including mechanical slot games, video slot games, video poker, video black jack, video pachinko and lottery, may be provided with gaming machines of this present invention. In particular, the gaming machine 2 may be operable to provide a play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 2 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a memory device of the remote host stores different game programs and instructions, executable by a gaming machine processor, to control the gaming machine. Each executable game program represents a different game or type of game, which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In one such embodiment, each gaming machine includes at least one or more display devices and/or one or more input switches for interaction with a player. A local processor, such as the above-described gaming machine processor or a processor of a local server, is operable with the display device(s) and/or the input switch(es) of one or more of the gaming machines. In operation, the remote host is operable to communicate one or more of the stored game programs to at least one local gaming machine processor. In different embodiments, the stored game programs are communicated or delivered by embedding the communicated game program in a device or a component (e.g., a microchip to be inserted in a gaming machine), writing the game program on a disc or other media, downloading or streaming the game program over a dedicated data network, internet or a telephone line. In different embodiments, the stored game programs are downloaded in response to a player inserting a player tracking card, a player selecting a specific game program, a player inserting a designated wager amount, the remote host communicating data to the gaming device regarding an upcoming tournament or promotion or any other suitable trigger. After the stored game programs are communicated from the remote host, the local gaming machine processor executes the communicated program to facilitate play of the communicated program by a player through the display device(s) and/or input switch(s) of the gaming machine. That is, when a game program is communicated to a local gaming machine processor, the local gaming machine processor changes the game or type of game played at the gaming machine. In some embodiments, the game program received at the gaming machine may include information for generating different button images on one or more projection buttons.

In one embodiment, the various games available for play on the gaming machine 2 may be stored as game software on a mass storage device in the gaming machine. In one such embodiment, the memory device of the gaming machine stores program codes and instructions, executable by the gaming machine processor, to control the games available for play on the gaming machine. The memory device also stores other data such as image data, event data, player input data, random or pseudo-random number generators, pay-table data or information and applicable game rules that relate to the play of the gaming machine. In another embodiment, the games available for play on the gaming machine may be generated on a remote gaming device but then displayed on the gaming machine.

In one embodiment, the gaming machine 2 may execute game software, such as but not limited to video streaming software that enables the game to be displayed on the gaming machine. When a game is stored on the gaming machine 2, it may be loaded from the mass storage device into a RAM for execution. In some cases, after a selection of a game, the game software that enables the selected game to be generated may be downloaded from a remote gaming device, such as another gaming machine.

As illustrated in the example of FIG. 12, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 (e.g., a video LCD display) for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 12. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 46) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others may have multiple displays.

Networks

In various embodiments, the remote gaming device may be connected to the host computer via a network of some type such as a local area network, a wide area network, an intranet or the Internet. In one such embodiment, a plurality of the gaming machines may be capable of being connected together through a data network. In one embodiment, the data network is a local area network (LAN), in which one or more of the gaming machines are substantially proximate to each other and an on-site remote host as in, for example, a gaming establishment or a portion of a gaming establishment. In another embodiment, the data network is a wide area network (WAN) in which one or more of the gaming machines are in communication with at least one off-site remote host. In this embodiment, the plurality of gaming machines may be located in a different part of the gaming establishment or within a different gaming establishment than the off-site remote host. Thus, the WAN may include an off-site remote host and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, the remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. In addition, various combinations of gaming devices are possible on the gaming machine. For example, some gaming machine only accept cash, cashless vouchers or electronic fund transfers and do not include coin acceptors or coin hoppers. Thus, those of skill in the art will understand that the present invention, as described below, can be deployed on most any gaming machine now available or hereafter developed.

In another embodiment, the gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming machine as disclosed herein may be a device that has obtained approval from a regulatory gaming commission or a device that has not obtained approval from a regulatory gaming commission.

Gaming Machine vs. General-Purpose Computer

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that enables the first state to be reconstructed is stored. This feature enables the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

In particular embodiments, a state of a gaming device may be reconstructed from game history information stored in multiple locations. For instance, in one embodiment, a gaming device operable to provide an ECI and a game interface simultaneously may not store state information for the ECI but only for the game interface. Thus, to reconstruct the state of gaming device including the ECI in a dispute, after a malfunction or after a power-failure, game history information may have to be retrieved from a local memory source on the gaming device and a remote memory source located on a remote host that provides the ECI. For example, the remote and gaming machine may store correlation information, such as timing information or referential information, that allows events on the gaming machine to be correlated to events occurring on the remote host. The correlation information stored at the gaming machine and/or remote host may be used to synchronize the reconstruction of a game state on the gaming machine. In a particular embodiment, a remote host that provides ECI services to a gaming device may provide an ECI that allows archival information regarding ECIs displayed on a gaming device to be retrieved.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In one or more embodiments, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Game Play

Returning to the example of FIG. 12, when a user wishes to play the gaming machine 2, he or she inserts a ticket or cash through the payment or coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices. In some embodiments, one or more of the player-input switches 32 may be a projection button and/or projection button panel.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. In some embodiments, one or more projection buttons associated with the gaming machine may display different images to generating an exciting visual effect. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In one embodiment, as described above, the gaming machine can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a slot game with one or more paylines. The paylines may be horizontal, vertical, circular, diagonal, angled or any combination thereof. In this embodiment, the gaming machine includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels, which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images, which preferably correspond to a theme associated with the gaming machine. In another embodiment, one or more of the reels are independent reels or unisymbol reels. In this embodiment, each independent or unisymbol reel generates and displays one symbol to the player. In one embodiment, the gaming machine awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel×3 symbols on the second reel×3 symbols on the third reel). A four reel gaming machine with three symbols generated in active symbol positions on each reel includes 81 ways to win (i.e., 3 symbols on the first reel×3 symbols on the second reel×3 symbols on the third reel×3 symbols on the fourth reel). A five reel gaming machine with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine may enable a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols, which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video draw poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, the base or primary game may be a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming machine displays a plurality of selectable indicia or numbers on at least one of the display devices. In this embodiment, the player selects at least one or a plurality of the selectable indicia or numbers via an input device such as a touch screen and/or projection button panel. The gaming machine then displays a series of drawn numbers to determine an amount of matches, if any, between the player's selected numbers and the gaming machine's drawn numbers. The player is provided an award based on the amount of matches, if any, based on the amount of determined matches.

In one embodiment, in addition to winning credits or other awards in a base or primary game, as described above, the gaming machine may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition may be by exceeding a certain amount of game play (such as number of games, number of credits, amount of time), or reaching a specified number of points earned during game play.

In another embodiment, the gaming machine processor or remote host randomly provides the player one or more plays of one or more secondary games. In one such embodiment, the gaming machine does not provide any apparent reasons to the player for qualifying to play a secondary or bonus game. In this embodiment, qualifying for a bonus game is not triggered by an event in or based specifically on any of the plays of any primary game. That is, the gaming machine may simply qualify a player to play a secondary game without any explanation or alternatively with simple explanations. In another embodiment, the gaming machine (or remote host) qualifies a player for a secondary game at least partially based on a game triggered or symbol triggered event, such as at least partially based on the play of a primary game.

In one embodiment, the gaming machine includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Gaming System Components

Figure 13:
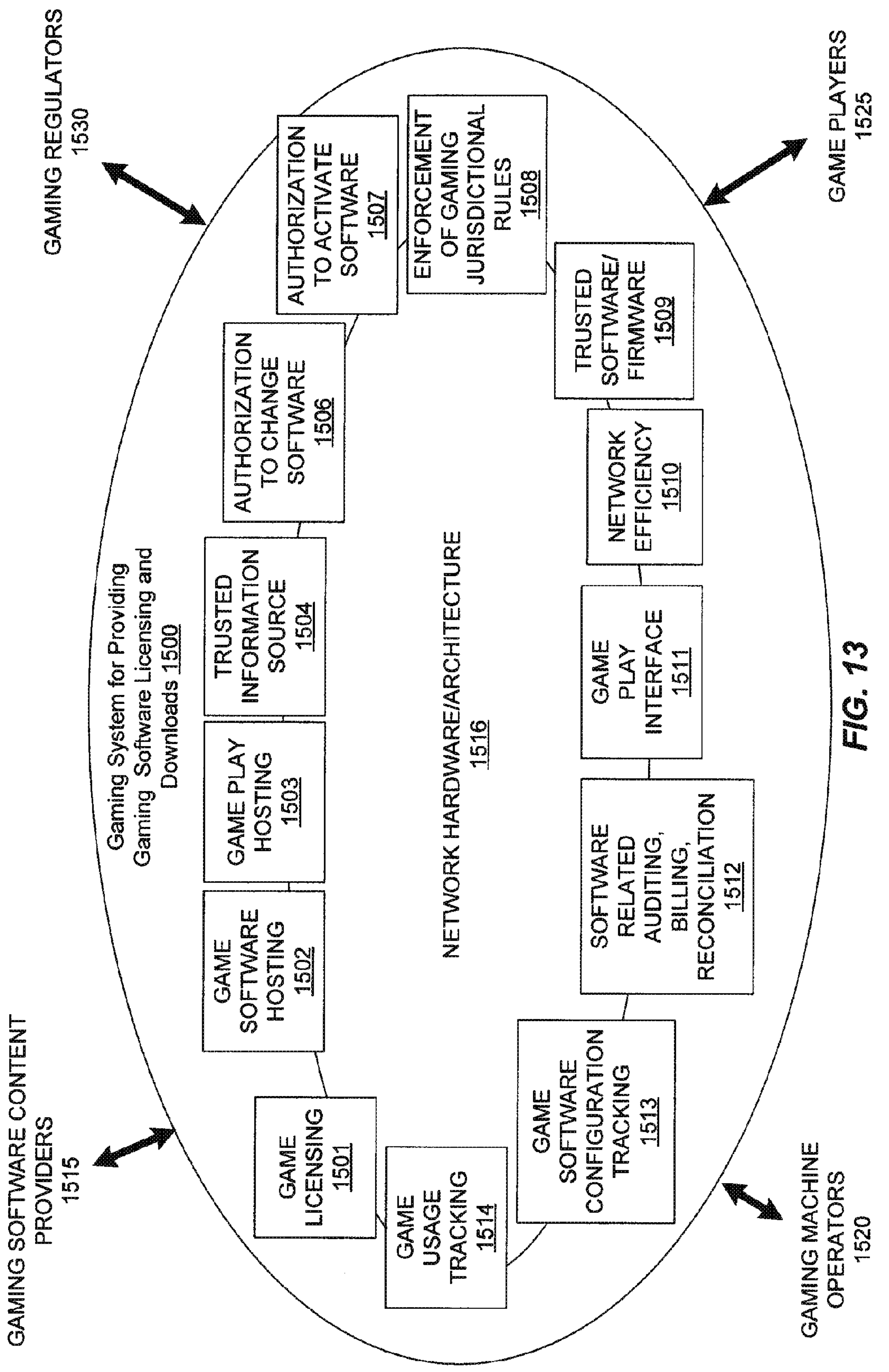
FIG. 13 shows a block diagram illustrating components of a gaming system, which may be used for implementing one or more embodiments of the present invention.

FIG. 13 shows a block diagram illustrating components of a gaming system 1500 which may be used for implementing one or more embodiments of the present invention. In FIG. 13, the components of a gaming system 1500 for providing game software licensing and downloads are described functionally. The described functions may be instantiated in hardware, firmware and/or software and executed on a suitable device. In the system 1500, there may be many instances of the same function, such as multiple game play interfaces 1511. Nevertheless, in FIG. 13, only one instance of each function is shown. The functions of the components may be combined. For example, a single device may comprise the game play interface 1511 and include trusted memory devices or sources 1509. The described components and their functions may be incorporated in various embodiments of the cashless gaming systems, devices, and techniques described herein.

The gaming system 1500 may receive inputs from different groups/entities and output various services and/or information to these groups/entities. For example, game players 1525 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1500, receive revenue for the use of their software and compensate the gaming machine operators. The gaming regulators 1530 may provide rules and regulations that must be applied to the gaming system and may receive reports and other information confirming that rules are being obeyed.

In the following paragraphs, details of each component and some of the interactions between the components are described with respect to FIG. 13. The game software license host 1501 may be a server connected to a number of remote gaming devices that provides licensing services to the remote gaming devices. For example, in other embodiments, the license host 1501 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1515 may track the usage of game software on a plurality of devices in communication with the host. The game usage-tracking host 1515 may be in communication with a plurality of game play hosts and gaming machines. From the game play hosts and gaming machines, the game usage tracking host 1515 may receive updates of an amount that each game available for play on the devices has been played and on amount that has been wagered per game. This information may be stored in a database and used for billing according to methods described in a utility based licensing agreement.

The game software host 1502 may provide game software downloads, such as downloads of game software or game firmware, to various devious in the game system 1500. For example, when the software to generate the game is not available on the game play interface 1511, the game software host 1502 may download software to generate a selected game of chance played on the game play interface. Further, the game software host 1502 may download new game content to a plurality of gaming machines via a request from a gaming machine operator. In some embodiments, new game content may include new graphical information for display on one or more projection buttons.

In one embodiment, the game software host 1502 may also be a game software configuration-tracking host 1513. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1503 may be a host server connected to a plurality of remote clients that generates games of chance that are displayed on a plurality of remote game play interfaces 1511. For example, the game play host device 1503 may be a server that provides central determination for a bingo game play played on a plurality of connected game play interfaces 1511. As another example, the game play host device 1503 may generate games of chance, such as slot games or video card games, for display on a remote client. A game player using the remote client may be able to select from a number of games that are provided on the client by the host device 1503. The game play host device 1503 may receive game software management services, such as receiving downloads of new game software, from the game software host 1502 and may receive game software licensing services, such as the granting or renewing of software licenses for software executed on the device 1503, from the game license host 1501.

In particular embodiments, the game play interfaces or other gaming devices in the gaming system 1500 may be portable devices, such as electronic tokens, cell phones, smart cards, tablet PC's and PDA's. The portable devices may support wireless communications and thus, may be referred to as wireless mobile devices. The network hardware architecture 1516 may be enabled to support communications between wireless mobile devices and other gaming devices in gaming system. In one embodiment, the wireless mobile devices may be used to play games of chance.

The gaming system 1500 may use a number of trusted information sources. Trusted information sources 1504 may be devices, such as servers, that provide information used to authenticate/activate other pieces of information. CRC values used to authenticate software, license tokens used to enable the use of software or product activation codes used to activate to software are examples of trusted information that might be provided from a trusted information source 1504. Trusted information sources may be a memory device, such as an EPROM, that includes trusted information used to authenticate other information. For example, a game play interface 1511 may store a private encryption key in a trusted memory device that is used in a private key-public key encryption scheme to authenticate information from another gaming device.

When a trusted information source 1504 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1500 of the present invention may include devices 1506 that provide authorization to download software from a first device to a second device and devices 1507 that provide activation codes or information that enable downloaded software to be activated. The devices, 1506 and 1507, may be remote servers and may also be trusted information sources. One example of a method of providing product activation codes that may be used with the present invention is describes in previously incorporated U.S. Pat. No. 6,264,561.

A device 1506 that monitors a plurality of gaming devices to determine adherence of the devices to gaming jurisdictional rules 1508 may be included in the system 1500. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1500 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1516 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to remain viable. Thus, in the present inventions, network efficient devices 1510 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 1512. For example, a software licensing billing server may generate a bill for a gaming device operator based upon a usage of games over a time period on the gaming devices owned by the operator. In another example, a software auditing server may provide reports on game software downloads to various gaming devices in the gaming system 1500 and current configurations of the game software on these gaming devices.

At particular time intervals, the software auditing server 1512 may also request software configurations from a number of gaming devices in the gaming system. The server may then reconcile the software configuration on each gaming device. In one embodiment, the software auditing server 1512 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 13. Many of the interactions are coupled. For example, methods used for game licensing may affect methods used for game downloading and vice versa. For the purposes of explanation, details of a few possible interactions between the components of the system 1500 relating to software licensing and software downloads have been described. The descriptions are selected to illustrate particular interactions in the game system 1500. These descriptions are provided for the purposes of explanation only and are not intended to limit the scope of the present invention.

Gaming System Configuration

In one embodiment, as described above, the present invention may be implemented in various configurations for gaming machines, including but not limited to: (1) a dedicated gaming machine, wherein the computerized instructions for controlling any games (which are provided by the gaming machine) are provided with the gaming machine prior to delivery to a gaming establishment; and (2) a changeable gaming machine, where the computerized instructions for controlling any games (which are provided by the gaming machine) are downloadable to the gaming machine through a data network when the gaming machine is in a gaming establishment. In another embodiment, the computerized instructions for controlling any games are communicated from the remote host, the central server or central controller to a gaming machine local processor and memory devices. In such a "thick client" embodiment, the gaming machine local processor executes the communicated computerized instructions to control any games (or other suitable interfaces) provided to a player.

In one alternative embodiment, the computerized instructions for controlling any games are executed by a remote host, a central server or central controller. In such a "thin client" embodiment, the remote host remotely controls any games (or other suitable interfaces) and the gaming machine is utilized to display such games (or suitable interfaces) and receive one or more inputs or commands from a player. In one embodiment, one or more gaming machines in a gaming system may be thin client gaming machines and one or more gaming machines in the gaming system may be thick client gaming machines. In another embodiment, certain functions of the gaming machine are implemented in a thin client environment and certain other functions of the gaming machine are implemented in a thick client environment. In one such embodiment, computerized instructions for controlling any primary games are communicated from the remote host to the gaming machine in a thick client configuration and computerized instructions for controlling any secondary games or bonus functions are executed by a remote host in a thin client configuration. It should be appreciated that one, more or each of the functions of the remote host as disclosed herein may be performed by one or more gaming machine processors. It should be further appreciated that one, more or each of the functions of one or more gaming machine processors as disclosed herein may be performed by the remote host.

In one embodiment, the gaming machine randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming machine generates the award or other game outcome to be provided to the player based on the associated probabilities. In this embodiment, since the gaming machine generates outcomes randomly or based upon one or more probability calculations, there is no certainty that the gaming machine will ever provide the player with any specific award or other game outcome.

In an alternative embodiment, the remote host maintains one or more predetermined pools or sets of predetermined game outcomes. In this embodiment, the remote host receives the game outcome request and independently selects a predetermined game outcome from a set or pool of game outcomes. The remote host flags or marks the selected game outcome as used. Once a game outcome is flagged as used, it is prevented from further selection from the set or pool and cannot be selected by the remote host upon another wager. The provided game outcome can include a primary game outcome, a secondary game outcome, primary and secondary game outcomes, or a series of game outcomes such as free games.

The remote host communicates the generated or selected game outcome to the initiated gaming machine. The gaming machine receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the remote host and communicated to the initiated gaming machine to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming machines based on the results of a bingo, keno or lottery game. In this embodiment, each individual gaming machine utilizes one or more bingo, keno or lottery games to determine the predetermined game outcome value provided to the player for the interactive game played at that gaming machine. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming machine is enrolled in the bingo game, such as upon an appropriate wager or engaging an input device, the enrolled gaming machine is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming machines, the same element may be present on all four of the bingo cards while another element may solely be present on one of the bingo cards.

In operation of these embodiments, upon providing or associating a different bingo card to each of a plurality of enrolled gaming machines, the remote host randomly selects or draws, one at a time, a plurality of the elements. As each element is selected, a determination is made for each gaming machine as to whether the selected element is present on the bingo card provided to that enrolled gaming machine. This determination can be made by the remote host, the gaming machine, a combination of the two, or in any other suitable manner. If the selected element is present on the bingo card provided to that enrolled gaming machine, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming machine requires the player to engage a daub button (not shown) to initiate the process of the gaming machine marking or flagging any selected elements.

After one or more predetermined patterns are marked on one or more of the provided bingo cards, a game outcome is determined for each of the enrolled gaming machines based, at least in part, on the selected elements on the provided bingo cards. As described above, the game outcome determined for each gaming machine enrolled in the bingo game is utilized by that gaming machine to determine the predetermined game outcome provided to the player. For example, a first gaming machine to have selected elements marked in a predetermined pattern is provided a first outcome of win $10 which will be provided to a first player regardless of how the first player plays in a first game and a second gaming machine to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming machine will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming machine may be provided a supplemental or intermittent award regardless of if the enrolled gaming machine's provided bingo card wins or does not win the bingo game as described above.

In another embodiment, the game outcome provided to the player is determined by a remote host and provided to the player at the gaming machine. In this embodiment, each of a plurality of such gaming machines are in communication with the remote host. Upon a player initiating game play at one of the gaming machines, the initiated gaming machine communicates a game outcome request to the remote host. In one embodiment, the remote host receives the game outcome request and randomly generates a game outcome for the primary game based on probability data. In another embodiment, the remote host randomly generates a game outcome for the secondary game based on probability data. In another embodiment, the remote host randomly generates a game outcome for both the primary game and the secondary game based on probability data. In this embodiment, the remote host is capable of storing and utilizing program code or other data similar to the processor and memory device of the gaming machine.

In another embodiment, one or more of the gaming machines are in communication with a remote host for monitoring purposes. In one embodiment, the gaming network includes a real-time or on-line accounting and gaming information system operably coupled to the remote host. The accounting and gaming information system of this embodiment includes a player database for storing player profiles, a player tracking module for tracking players and a credit system for providing automated casino transactions.

In another embodiment, a plurality of gaming machines at one or more gaming sites may be networked to the remote host in a progressive configuration, as known in the art, wherein a portion of each wager to initiate a base or primary game may be allocated to one or more progressive awards. In one embodiment, a progressive gaming system host site computer is coupled to a plurality of the remote hosts at a variety of mutually remote gaming sites for providing a multi-site linked progressive automated gaming system. In one embodiment, a progressive gaming system host site computer may serve gaming machines distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each remote host computer is responsible for all data communication between the gaming machine hardware and software and the progressive gaming system host site computer. In one embodiment, an individual gaming machine may trigger a progressive award win. In another embodiment, a remote host (or the progressive gaming system host site computer) determines when a progressive award win is triggered. In another embodiment, an individual gaming machine and a remote host (or progressive gaming system host site computer) work in conjunction with each other to determine when a progressive win is triggered, for example through an individual gaming machine meeting a predetermined requirement established by the remote host.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming machine is randomly or apparently randomly selected to provide a player of that gaming machine one or more progressive awards. In one such embodiment, the gaming machine does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, the gaming system maintains at least one progressive award by allocating a percentage of a player's wager into the player's own progressive award or pool (i.e., a personal progressive award). In this embodiment, upon the occurrence of an event (either associated with game play or independent of game play), the gaming system provides the player their personal progressive award.

In another embodiment, a plurality of players at a plurality of linked gaming machines in a gaming system participate in a group gaming environment. In one embodiment, a plurality of players at a plurality of linked gaming machines work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming machines compete against one another for one or more awards. In one such embodiment, a plurality of players at a plurality of linked gaming machines participate in a gaming tournament for one or more awards. In another embodiment, a plurality of players at a plurality of linked gaming machines play for one or more awards wherein an outcome generated by one gaming machine affects the outcomes generated by one or more linked gaming machines.

Some networks described herein provide methods and devices for managing one or more networked gaming establishments. Such networks may sometimes be referred to herein as server-based gaming networks, Sb™ networks, or the like. Some such gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines, mobile gaming devices, thin clients and/or other devices, such as kiosks, networked gaming tables, player stations, etc.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations (such as interim and final game outcomes, bonuses, etc.) may be made by one or more servers or other networked devices. Player tracking functions, accounting functions and even some display-related functions associated with wagering games may be performed, at least in part, by one or more devices of casino network and/or of a central system.

What is claimed is:

1. A gaming machine comprising:
- a gaming machine cabinet;
- a main display configured to display game play data of one or more games of chance;
- an output device configured to output an item of value based on play of the one or more games of chance;
- a projection button panel configured to receive user input, the projection button panel including a plurality of projection buttons, one or more of the projection buttons operable to place a wager on the one or more games of chance, each projection button comprising:
  - a button casing at least partially defining an interior of said projection button;
  - an individual projection surface supported by the button casing and located within the interior of the projection button, the projection surface capable of being viewed from an exterior of the projection button by a player of the gaming machine;
  - an individual button projector proximate to the projection surface, the button projector configured to receive button image information and to project, based on the received button image information, a button image onto the projection surface;

an individual mirror supported by the button casing and located within the interior of the projection button, the mirror reflecting the button image onto the projection surface; and one or more sensors capable of being activated responsive to activation of the projection button, the one or more sensors configured to output a signal indicating that one or more of the one or more sensors have been activated; and one or more controllers in communication with the main display and the projection button panel, the one or more controllers configured to:

output the game play data to the main display;

transmit, to the projection button panel, the button image information;

receive, from the projection button panel, the signal indicating that one or more of the sensors have been activated; and process the received signal to identify a selection associated with the projected button image.

2. The gaming machine of claim 1, wherein the button projector is a laser projector configured to modulate one or more laser beams in order to project a raster-based image.

3. The gaming machine of claim 1, wherein each button projector is supported by the button casing of the corresponding button and located within the interior of the corresponding button.

4. The gaming machine of claim 1, wherein each projection button further comprises a lens supported by the button casing of said projection button and disposed between the projection surface and the button projector of said projection button, the button projector projecting the button image onto the projection surface through the lens.

5. The gaming machine of claim 1, wherein the mirror is a two-way mirror.

6. The gaming machine of claim 1, wherein the mirror is a one-way mirror.

7. The gaming machine of claim 1, wherein each projection button further comprises a lens supported by the button casing of said projection button and disposed within the interior of the projection button, wherein the mirror is located to reflect the button image onto the projection surface through the lens.

8. The gaming machine of claim 1, wherein each projection button further comprises a button cap supported by the button casing of said projection button, said button cap configured to cover and protect one or more interior components of the projection button.

9. The gaming machine of claim 8, wherein at least two of the button caps are of different shapes or sizes.

10. The gaming machine of claim 8, wherein each button cap is removably coupled with the corresponding projection button.

11. The gaming machine of claim 1, wherein each projection button is a mechanical button having a raised level and a depressed level.

12. The gaming machine of claim 11, wherein the one or more sensors include a mechanical sensor disposed within the projection button, the mechanical sensor being activated when the projection button is positioned at the depressed level, the mechanical sensor configured to transmit a signal indicating that the mechanical sensor has been activated to the one or more controllers.

13. The gaming machine of claim 12, wherein each projection button further comprises an upper portion and a lower portion, the lower portion being fixed relative to the projection button panel, the upper portion being movable between the raised level and the depressed level.

14. The gaming machine of claim 13, wherein each projection button further comprises a mechanical plunger disposed within the upper portion, the button projector and the mechanical sensor being disposed within the lower portion, the mechanical plunger exerting pressure on the mechanical sensor when the projection button is positioned at the depressed level.

15. The gaming machine of claim 13, wherein the lower portion comprises a plurality of guide pins and the upper portion comprises a plurality of holes fitted to the guide pins, the holes sliding along the guide pins as the upper portion moves between the raised level and the depressed level.

16. The gaming machine of claim 1, wherein the one or more sensors include a touch sensor disposed at or near an exterior surface of the projection button, the touch sensor being activated by physical pressure on the exterior surface of the projection button, the touch sensor configured to transmit a signal indicating that the touch sensor has been activated to the one or more controllers.

17. A gaming machine comprising:

a gaming machine cabinet;

a main display configured to display game play data of one or more games of chance;

an output device configured to output an item of value based on play of the one or more games of chance;

a projection button panel configured to receive user input, the projection button panel including:

a plurality of projection buttons, each projection button comprising a button casing at least partially defining an interior of said projection button; an individual projection surface supported by the button casing and located within the interior of the projection button, the projection surface capable of being viewed from an exterior of the projection button by a player of the gaming machine; an individual mirror supported by the button casing and located within the interior of the projection button, the mirror reflecting the button image onto the projection surface; and one or more sensors capable of being activated responsive to input, the one or more sensors configured to output a signal indicating that one or more of the sensors have been activated, one or more of the projection buttons operable to place a wager on the one or more games of chance; and a plurality of button projectors proximate to one or more of the projection surfaces associated with the plurality of projection buttons, each button projector configured to receive button image information and to project, based on the received button image information, a button image onto at least one of the one or more projection surfaces; and one or more controllers in communication with the main display and the projection button panel, the one or more controllers configured to:

output the game play data to the main display;

transmit, to the projection button panel, the button image information;

receive, from the projection button panel, the signal indicating that one or more of the sensors have been activated; and process the received signal to identify a selection associated with the projected button image.

18. The gaming machine of claim 17, wherein the button projector is a laser projector configured to modulate one or more laser beams in order to project a raster-based image.

19. The gaming machine of claim 17, wherein each button projector is disposed beneath at least two of the projection buttons and configured to project a button image onto the at least two projection buttons.

20. The gaming machine of claim 17, wherein each projection button further comprises a lens supported by the button casing of said button and disposed within the interior of the corresponding projection button between the projection surface of the corresponding projection button and the button projector, the button projector projecting the button image onto the projection surface through the lens.

21. The gaming machine of claim 17, wherein the mirror is a two-way mirror.

22. The gaming machine of claim 17, wherein the projection button panel further comprises, for each projection button, a lens supported by the button casing of said button and disposed within the interior of the projection button; wherein the mirror is located to reflect the button image onto the projection surface through the lens.

23. The gaming machine of claim 17, wherein each projection button further comprises a button cap supported by the button casing of said projection button and configured to cover and protect one or more interior components of the projection button.

24. The gaming machine of claim 23, wherein at least two of the projection buttons are of different shapes or sizes.

25. The gaming machine of claim 23, wherein each button cap is removably coupled with the corresponding projection button.

26. The gaming machine of claim 17, wherein each projection button is a mechanical button having a raised level and a depressed level.

27. The gaming machine of claim 26, wherein the one or more sensors include a mechanical sensor disposed within the projection button, the mechanical sensor being activated when the projection button is positioned at the depressed level, the mechanical sensor configured to transmit a signal indicating that the mechanical sensor has been activated to the one or more controllers.

28. The gaming machine of claim 27, wherein each projection button further comprises an upper portion and a lower portion, the lower portion being fixed relative to the projection button panel, the upper portion being movable between the raised-level and the depressed level.

29. The gaming machine of claim 28, wherein each projection button further comprises comprising a mechanical plunger disposed within the upper portion, the button projector and mechanical sensor being disposed within the lower portion, the mechanical plunger exerting pressure on the mechanical sensor when the projection button is positioned at the depressed level.

30. The gaming machine of claim 28, the lower portion comprising a plurality of guide pins and the upper portion comprising a plurality of holes fitted to the guide pins, the holes sliding along the guide pins as the upper portion moves between the raised level and the depressed level.

31. The gaming machine of claim 17, wherein the one or more sensors include a touch sensor disposed at or near an exterior surface of the projection button, the touch sensor being activated by physical pressure on the exterior surface of the projection button, the touch sensor configured to transmit a signal indicating that the touch sensor has been activated to the one or more controllers.

* * * * *